(12) United States Patent
Sasaki et al.

(10) Patent No.: US 6,762,984 B1
(45) Date of Patent: Jul. 13, 2004

(54) INFORMATION RECORDED MEDIUM, INFORMATION RECORDING/ REPRODUCING METHOD, AND INFORMATION RECORDING/ REPRODUCING DEVICE

(75) Inventors: Miyuki Sasaki, Osaka (JP); Yoshiho Goto, Osaka (JP); Yoshihisa Fukushima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/830,553

(22) PCT Filed: Nov. 11, 1999

(86) PCT No.: PCT/JP99/06280
§ 371 (c)(1),
(2), (4) Date: Jul. 20, 2001

(87) PCT Pub. No.: WO00/30106
PCT Pub. Date: May 25, 2000

(30) Foreign Application Priority Data

Nov. 13, 1998 (JP) .......................................... 10-323231
Mar. 10, 1999 (JP) ............................................. 11-62761

(51) Int. Cl.[7] .............................. G11B 7/00; G06F 17/00
(52) U.S. Cl. ................................ 369/53.24; 369/30.04; 707/102; 707/205
(58) Field of Search ............................ 369/47.14, 47.15, 369/47.16, 30.04, 30.09, 30.12, 59.26, 53.24; 707/102, 205

(56) References Cited

U.S. PATENT DOCUMENTS

| 5,210,734 A | 5/1993 | Sakurai .................. 369/47.16 |
| 5,293,566 A | 3/1994 | Satoh et al. ............. 369/47.14 |
| 5,844,739 A | 12/1998 | Mizushima et al. | |
| 5,978,958 A | 11/1999 | Tanaka et al. | |
| 6,091,686 A | * 7/2000 | Caffarelli et al. ........ 369/53.24 |
| 6,243,340 B1 | * 6/2001 | Ito et al. | |

FOREIGN PATENT DOCUMENTS

| EP | 507397 | 10/1992 |
| EP | 0803815 | 10/1997 |
| JP | 64-79940 | 3/1989 |
| JP | 4-353685 | 12/1992 |
| JP | 9-288884 | 11/1997 |
| WO | 97/17657 | 5/1997 |

OTHER PUBLICATIONS

English Language Abstract of JP 9–288884.
English Language Abstract of JP 4–353685.
English Language Abstract of JP 64–79940.

* cited by examiner

Primary Examiner—Doris H. To
Assistant Examiner—Jorge L Ortiz-Criado
(74) Attorney, Agent, or Firm—Greenblum & Bernstein, P.L.C.

(57) ABSTRACT

The present invention has as an object to accomplish reliable data reproduction in a data reproducing apparatus in which servo operation easily becomes unstable in an unrecorded disc area, and provides a data storage medium whereby the highest address of the reproducible data area is obtained by the optical disc drive, and reproduction is possible using only a normal READ command, without providing a physical area in the volume space. Address information (181) for an integrity information area (111) allocated in the first overrun extent in the volume space is recorded to a lead-in area (101) reproducible by an optical disc drive. As a result, when a disc is inserted to a data reproducing apparatus, address information for the first integrity information in the volume space is recorded to the lead-in area, or the highest address of the reproducible data area is obtained by the data reproducing apparatus following the integrity information, preventing the optical disc drive from accessing an unrecorded disc area.

5 Claims, 17 Drawing Sheets

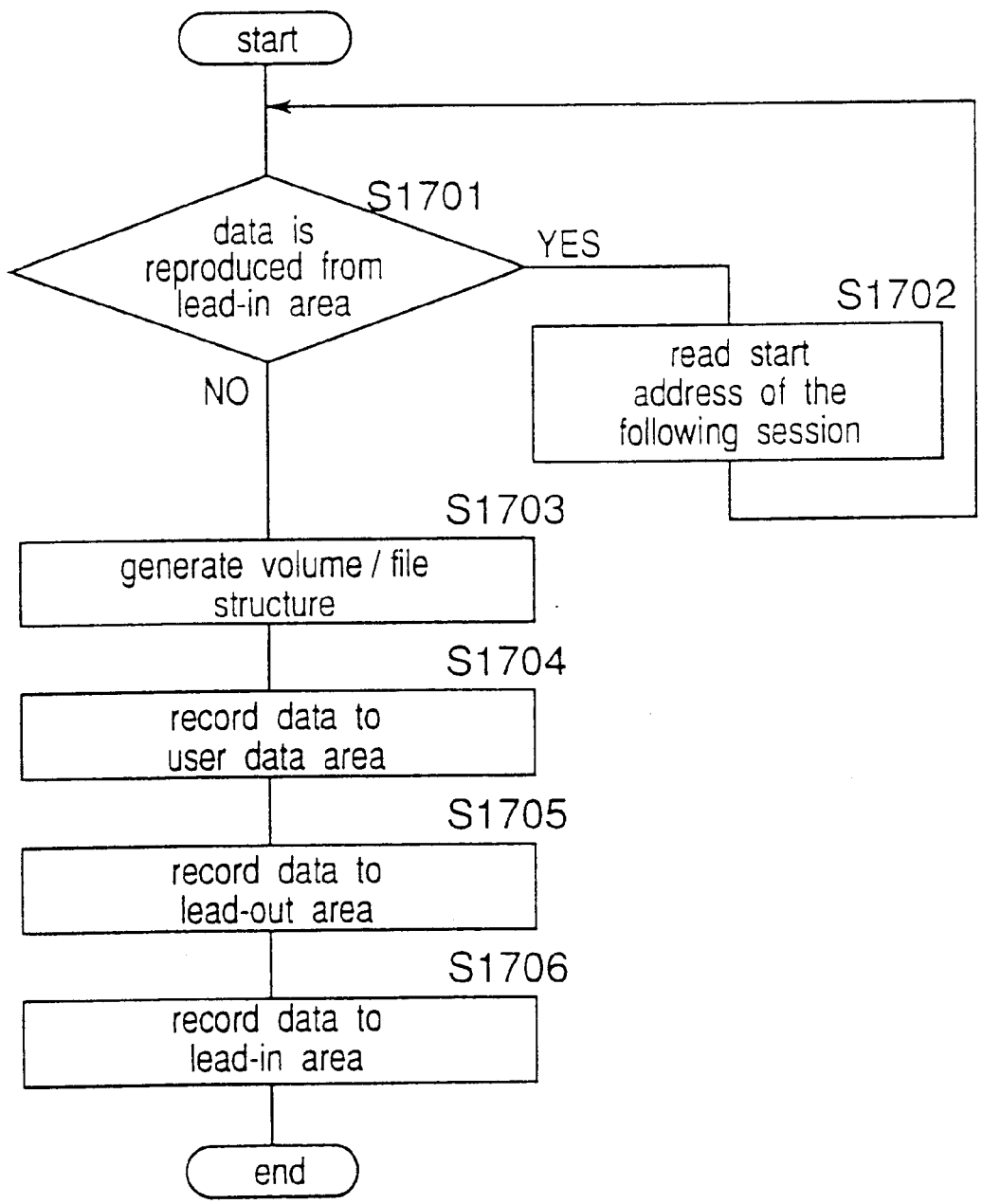

INFORMATION RECORDED MEDIUM, INFORMATION RECORDING/REPRODUCING METHOD, AND INFORMATION RECORDING/REPRODUCING DEVICE

TECHNICAL FIELD

The present invention relates to a data storage medium to which files managed using a volume/file structure are recorded and reproduced, and in which the number of data recording operations to any same area is limited, and to a data recording and reproducing method and data recording and reproducing apparatus using this data storage medium. More particularly, the present invention relates to a data storage medium wherein start address information for integrity information indicative of a volume status is located outside the volume space, and to a data recording and reproducing method and a data recording and reproducing apparatus which use this data storage medium.

BACKGROUND ART

While media of various types have been used in recent years for recording digital data, CD-R discs in particular have quickly become commonly used as a low-cost recordable optical disc medium. The multi-session method is now well known as a technique for appending data to these CD-R discs; a data recording operation using this multi-session method is described next below with reference to the accompanying figures.

FIG. 15 shows the data structure of a CD-R disc to which files managed using the volume/file structure defined in the ISO 9660 standard are recorded using a multi-session method. In a multi-session recording method, files and volume/file structure for managing the files are recorded in session units. Each session has a lead-in area, an inner link area, a user data area, and a lead-out area. It is to be noted that only the first session does not have a lead-in area. In addition, an outer link area is formed between sessions.

When recording data by session unit, a file and volume/file structure for managing the file are first recorded to the user data area. The lead-out area is then recorded. This lead-out area is recorded to make data reproduction easier on a CD-ROM drive which is unable to detect a location in an unrecorded data area on a CD-R disc because it is unable to detect the wobble address recorded to the CD-R disc. Data indicative of the address for a next session or user data area is then recorded to the lead-in area. A run-in block and run-out block are additionally recorded at the beginning and end of each area when recording to the user data area, lead-in area, or lead-out area. The run-in and run-out blocks are also partially overwritten on disc, and these overwritten areas are referred to as link blocks. An inner link area comprising a run-out block, link block, and run-in block is thus formed between a lead-in area and user data area and between a user data area and lead-out area, and an outer link area having the same configuration is formed between a lead-out area and lead-in area.

FIG. 16 shows the directory structure used for managing files recorded to a CD-R disc in conjunction with the data structure shown in FIG. 15. The directory structure shown in FIG. 16 has a subdirectory (Dir-A) for managing a data file (File-a), a subdirectory (Dir-B) for managing a data file (File-b), and a subdirectory (Dir-C) for managing a data file (File-c) below the root directory. When data file (File-a), data file (File-b), and data file (File-c) are sequentially recorded during a first session, second session, and third session in accordance with this directory structure, the data structure described above with reference to FIG. 15 is formed on the CD-R disc.

FIG. 17 is a flow chart describing a recording operation for forming the data structure shown in FIG. 15 on a disc. The data recording operation performed each session is described next below according to the steps shown in this flow chart.

(Step S1701) When a CD-R disc is inserted into the disk recorder, the disk recorder accesses the lead-in area reserved at a specific location at the inside circumference of the disc, and attempts to read the TOC data from this lead-in area. This TOC data is a table of contents for the data recorded on the data storage medium. If the TOC data is reproduced from the lead-in area, a step (S1702) for retrieving the following session data is performed. However, if the data could not be reproduced because the lead-in area is unrecorded, the session data recording operation is performed according to the procedure beginning in step (S1703).

(Step S1702) If the TOC data is reproduced from the lead-in area, the disk recorder reads the start address of the following session contained in this TOC data, returns to step (S1701), and then tries to reproduce data from the lead-in area of the following session.

(Step S1703) When a lead-in area to which no data is recorded is detected, the file recorded as the session data and the volume/file structure for managing said file are generated as follow.

First, when data is not reproduced from the first lead-in area, the data file (File-a) to be recorded as the data for the first session, subdirectory (Dir-A) for managing data file (File-a), a directory file for managing the root directory, and volume/file structure, such as a primary volume descriptor and path table, for managing these files and the directory file, are generated according to the ISO 9660 standard.

If TOC data is reproduced from the first lead-in area, the volume/file structure and directory file are read using the user data area start address contained in the last read TOC data. For example, with a disc to which only a first session has been recorded, data is read from user data area 1502; with a disc that has been recorded from a first session to a second session, data is read from user data area 1505. The content of the volume/file structure is then updated by adding the file newly recorded to the read data and a directory file for managing said file. For example, data file (File-b) and the directory file (Dir-B) of the subdirectory for managing data file (File-b) are added to the data read from user data area 1502 on a disc to which only a first session has been recorded, and a new volume/file structure is then generated; data file (File-c) and the directory file (Dir-C) of the subdirectory for managing data file (File-c) are added to the data read from user data area 1505 on a disc to which a second session has also been recorded, and a new volume/file structure is then generated.

(Step S1704) When the volume/file structure to be recorded to a user data area is generated, a lead-in area and run-out block of predetermined recordingsize are skipped, and the recording data generated in step (S1703) to which a predefined link block/run-in block and link block/run-out block have been added therebefore and thereafter is continuously recorded.

(Step S1705) When data recording to the user data area is completed, recording data having a predefined link block/run-in block and link block/run-out block added before and after the data recorded to the lead-out area is generated. The resulting recording data is then recorded continuously from the link block following the run-out block recorded in step (S1704). When recording the first session, for example, this operation records lead-out area 1503 and the link block/run-in block and run-out block/link block located therebefore and thereafter. When recording a second session, this operation records lead-out area 1506 and the link block/run-in block and run-out block/link block located therebefore and thereafter.

(Step S1706) When data recording to the lead-out area is completed, the start address of the next session is calculated with consideration for the predetermined recordingsize of the outer link area. The calculated start address of the next session is then embedded in the TOC data recorded to the lead-in area together with the start address for the user data area recorded in step (S1704).

Recording data comprising predefined link block/run-in block and run-out block/link block units before and after the recording data for the lead-in area is then generated. The resulting recording data is then recorded continuously from a specific position at the inside circumference of the disk if the first session is being recorded, and from the link block following the run-out block recorded in step (S1705) if a second or third session is being recorded. As a result of this recording operation, the lead-in area 1501 at the most inside circumference and the run-out block/link block located immediately thereafter are recorded in the recording operation for a first session, for example. In a recording operation for a second session, the lead-in area 1504 and the link block/run-in block and run-out block/link block units positioned therebefore and thereafter are recorded, and the data recording operation ends.

The data recording operation described above forms a multi-session data structure such as shown in FIG. 15 on the disc. A logical sector number (LSN) is assigned to each sector in the data structure shown in FIG. 15 with the first sector in the user data area in the first session designated 0, and the logical sector number rising continuously at each successive sector. The volume space is defined as the area beginning from the sector at LSN 0.

The operation whereby a data file (File-a) is reproduced from the first session of a disk having a data structure as shown in FIG. 15 is described next below with reference to FIG. 15 and FIG. 17.

When a CD-R disc is inserted to a disc reader, the disc reader follows the procedure shown in steps (S1701) to (S1703) in the flow chart in FIG. 17 to read the latest volume/file structure 1520 from the user data area of the third session. If a CD-ROM drive is connected to a computer system, the host computer obtains the start address for the user data area of the third session to which the latest volume/file structure is recorded by executing a READ TOC command. Using this start address, it then calculates the LSN of the sector to which the latest volume/file structure is recorded, and reads this structure from the disc.

Next, when the latest volume/file structure 1520 is read, the structure is interpreted according to the ISO 9660 standard using the primary volume descriptor 1521, path table 1522, root directory 1523, and directory file (Dir-A) 1524 for managing data file (File-a) 1525. The recording position of the data file is then read from the directory record of the data file (File-a) 1525 contained in directory file (Dir-A) 1524.

The data file (File-a) 1525 recorded to the user data area of the first session is then reproduced based on said data file recording position.

DISCLOSURE OF INVENTION (Technical Problem to be Solved by the Invention)

With a data storage medium recorded using a multi-session method as described above, TOC data recorded to a lead-in area outside the volume space must be read using a special command such as the above-noted READ TOC command in order to find an unrecorded area of the medium for recording a data file or file management information for managing the data file to the medium, or to find the latest file management information on the medium for reproducing a data file or file management information for managing a data file on the medium.

Furthermore, when the disc is removed from the drive, a large volume of data must be recorded every time to the lead-out area and lead-in area.

Furthermore, when a read-only disk drive without the ability to detect a disc location from an unrecorded area accesses an unrecorded area, the head is unstable because a servo signal cannot be detected, resulting possibly in contact with the disc and the disc thus being scratched. In order for a CD-ROM drive to access such an unrecorded disk area, it is therefore necessary to detect the unrecorded area using a special method such as detecting the presence or absence of a servo signal.

(Solution)

The present invention solves the above problems, and has as its object to provide a data storage medium enabling a data recording status to be determined using a volume/file structure, and preventing data read operations by a data reproduction device from an unrecorded disc area.

To achieve the above object, a data storage medium according to the present invention is a data storage medium in which a file managed using a volume/file structure is recorded and reproduced from one end of a data recording area, and in which a number of data recording operations to a same area is limited, and comprises a physical format information area in a part of a lead-in area for recording address information of an open integrity information area allocated in a first overrun extent.

Furthermore, a data recording method according to the present invention is a data recording method for accomplishing a data recording operation to a data storage medium in which a file managed using a volume/file structure is recorded and reproduced from one end of a data recording area, and in which a number of data recording operations to a same area is limited, comprising a step for recording, to a part of a lead-in area in a first closing process applied to the medium, physical format information for recording address information of an open integrity information area allocated in a first overrun extent.

Furthermore, data recording apparatus according to the present invention is a data recording apparatus for accomplishing a data recording operation to a data storage medium in which a file managed using a volume/file structure is recorded and reproduced from one end of a data recording area, and in which a number of data recording operations to a same area is limited, comprising a means for recording, to a part of a lead-in area in a first closing process applied to the medium, physical format information for recording address information of an open integrity information area allocated in a first overrun extent.

Furthermore, a data reproducing method according to the present invention is a data reproducing method for applying a data reproducing operation to a data storage medium in which a file managed using a volume/file structure is recorded and reproduced from one end of a data recording area, and in which a number of data recording operations to a same area is limited, comprising: a step for reproducing, from a lead-in area, physical format information recording address information for an open integrity information area allocated in a first overrun extent; a step for reproducing from an overrun extent a logical volume integrity descriptor in a close status and storing address information for a logical integrity information area in an open status; and a step for reproducing from an overrun extent a logical volume integrity descriptor in an open state and storing address information for a logical integrity information area in a close status.

Furthermore, a data reproducing apparatus according to the present invention is a data reproducing apparatus for applying a data reproducing operation to a data storage medium in which a file managed using a volume/file structure is recorded and reproduced from one end of a data recording area, and in which a number of data recording operations to a same area is limited, comprising: a means for reproducing, from a lead-in area, physical format information recording address information for an open integrity information area allocated in a first overrun extent; a means for reproducing from an overrun extent a logical volume integrity descriptor in a close status and storing address information for a logical integrity information area in an open state; and a means for reproducing from an overrun extent a logical volume integrity descriptor in an open status and storing address information for a logical integrity information area in a close status.

BRIEF DESCRIPTION OF DRAWINGS

FIG. 17 is a flow chart of a conventional multi-session data recording operation.

BEST MODE FOR CARRYING OUT THE INVENTION

In a data storage medium according to the present invention, address information for an open integrity information area allocated in the first overrun extent of the volume space is recorded to the lead-in area. A data reproducing apparatus obtains the highest address of the readable data recording area and manages operation to prevent reading from an unrecorded disc area by chaining reading successive open integrity information and close integrity information for assuring consistency. The data reproducing apparatus can therefore reproduce the latest file structure using data recorded in the volume space without attempting a read operation from an unrecorded disc area during the operation for reading a data file and file structure for managing the data file.

Furthermore, integrity information for detecting the consistency of file structure is recorded to the overrun extent as open integrity information at the start of data recording, and as close integrity information when data recording is completed, in a data storage medium according to the present invention. It is therefore possible to detect an open disc status, which occurs when a disc is removed during a data recording operation or when an error occurs during a data recording operation, and thereby improve the reliability of recorded data.

A preferred embodiment of the present invention is described below with reference to the accompanying figures.

A data storage medium for recording within a volume space files managed with a volume/file structure as defined by the ISO 13346 standard using a data storage medium such as a CD-R disc or CD-RW disc to which the number of data recording operations to a same disc area is limited, and a data recording and reproducing method and data recording and reproducing apparatus using this data storage medium, are described below as a preferred embodiment of the present invention with reference to the accompanying figures. It is to be noted that unless otherwise specifically noted, the various descriptors, pointers, and other elements recorded to the data storage medium as the volume/file structure in the following description shall be those used in a data structure conforming to ISO 13346.

Figure 5:
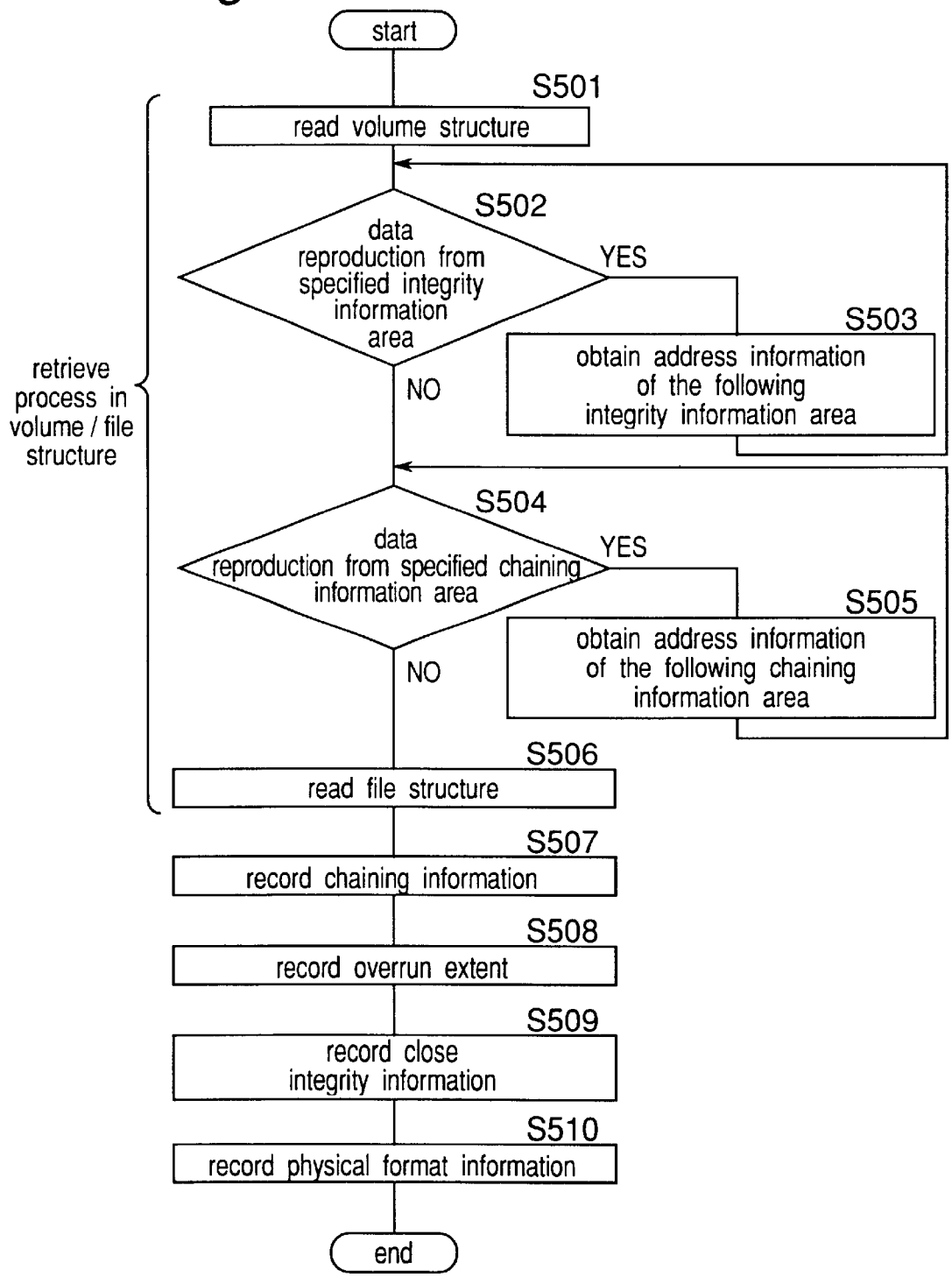
FIG. 5 is a flow chart describing a file closing process of a data recording and reproducing apparatus according to the present invention.
Figure 7:
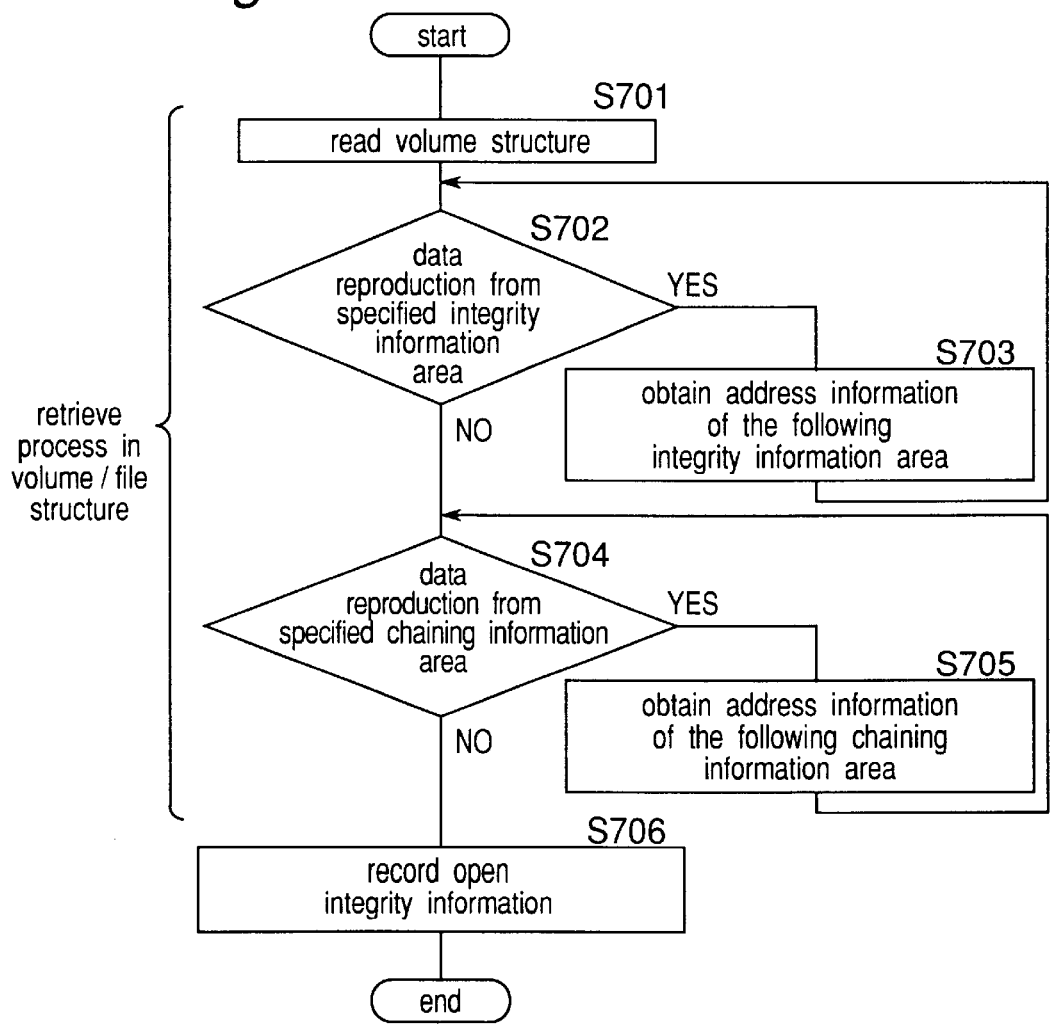
FIG. 7 is a flow chart describing an opening process of a data recording and reproducing apparatus according to the present invention.
Figure 9:
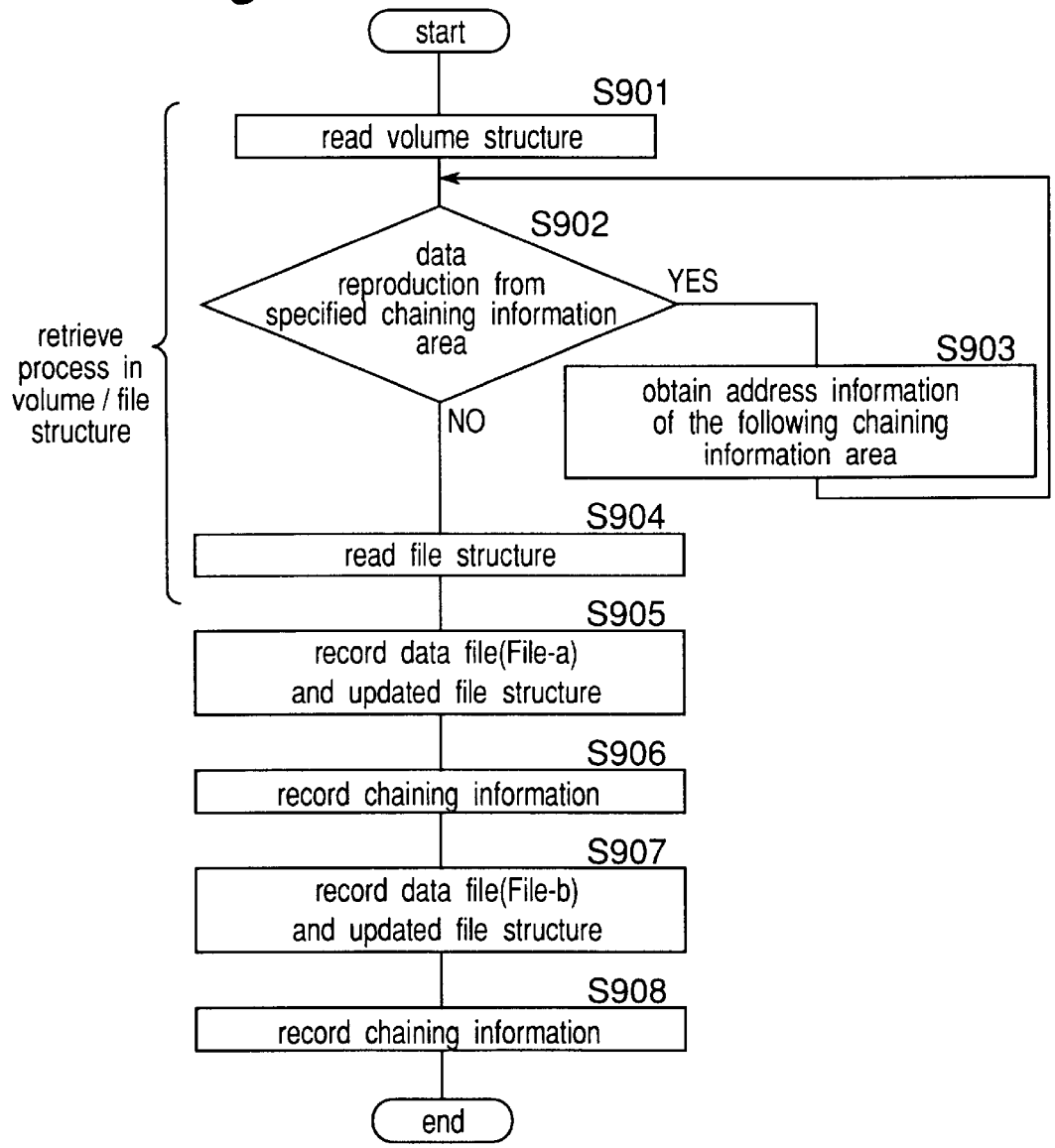
FIG. 9 is a flow chart describing a file recording process of a data recording and reproducing apparatus according to the present invention.

The area structure of a data storage medium is described first below with reference to FIG. 1, and the data recording and reproducing apparatus is described with reference to the block diagram in FIG. 2. After then describing a process for formatting this data storage medium with reference to FIG. 3, the closing process as shown in FIG. 5, the opening process as shown in FIG. 7, and the file recording process as shown in FIG. 9, the data structure that is characteristic of a data storage medium according to the present invention is described in detail. Next, the block diagram of a data reproducing apparatus shown in FIG. 11, the process shown in FIG. 12 whereby the data reproducing apparatus obtains the highest address of the reproducible data area, and the process shown in FIG. 13 for identifying readable areas during data reproduction, are described. Finally, a process for reproducing files from this data storage medium is described with reference to FIG. 14.

Figure 1:
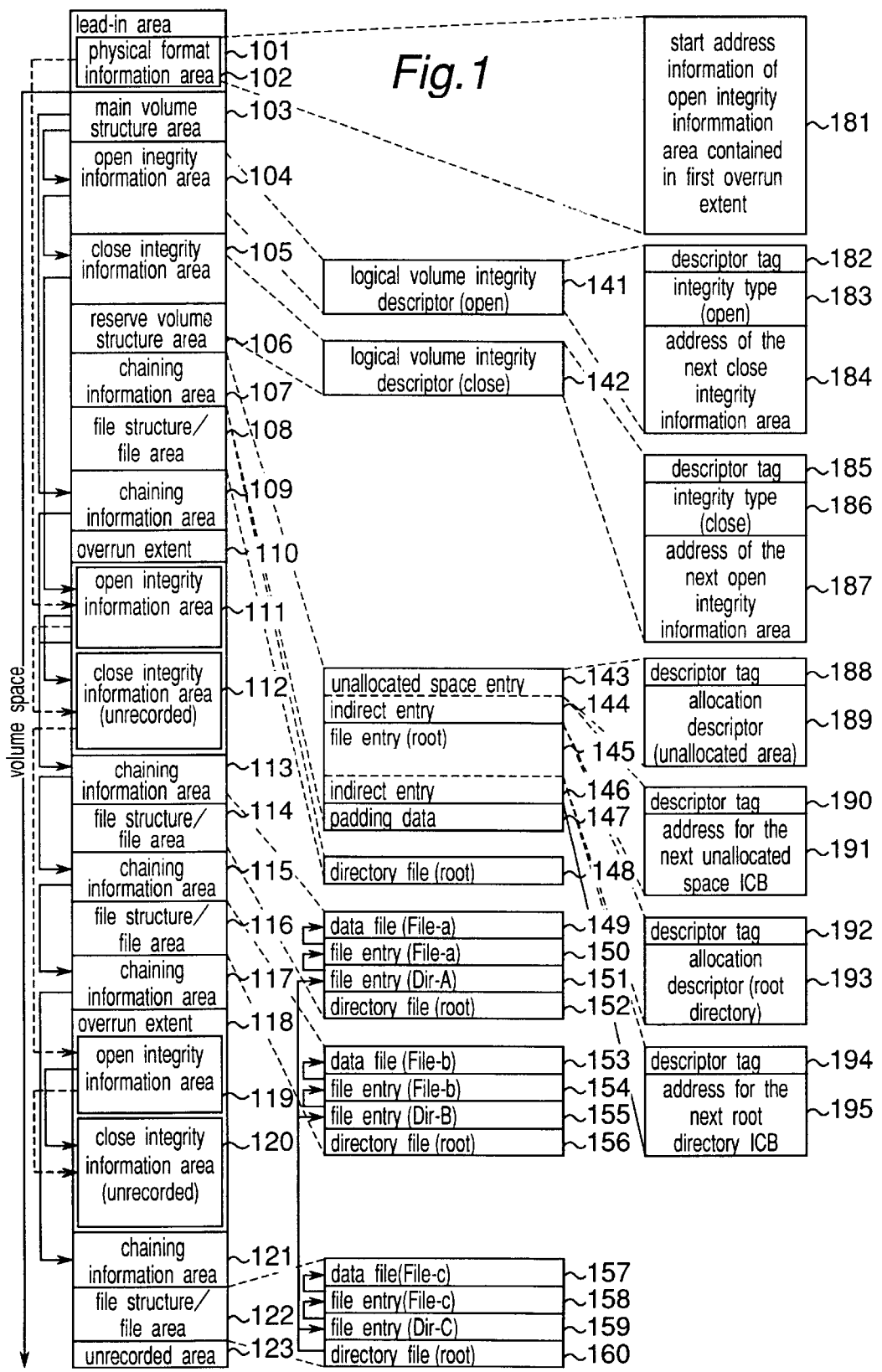
FIG. 1 is a data structure diagram showing the area structures in a data storage medium according to a preferred embodiment of the present invention.

FIG. 1 is a data structure diagram showing the area structure written to a data storage medium according to this preferred embodiment of the invention. As shown in FIG. 1, the volume space is formed beyond the lead-in area 101, which contains physical format information area 102. During the formatting process, a main volume structure area 103 to which volume structure is recorded is formed at the beginning of the volume space; a reserve volume structure area 106 for recording a copy of the volume structure is also formed. An open integrity information area 104 for recording a logical volume integrity descriptor indicative of an open status, a chaining information area 107 for recording chaining information containing an unallocated space ICB (information control block) and a root directory ICB, and file structure/file area 108 containing a root directory file, are formed next.

In the closing process performed so that a data reproducing apparatus that does not have the ability to detect a disk location from an unrecorded disk area can detect the latest data structure, chaining information area 109 and overrun extent 110, which contains unrecorded open integrity information area 111 and close integrity information area 112, are formed. Next, close integrity information area 105 for recording a logical volume integrity descriptor indicative of a close status is formed next. Finally, start address information 181 for the open integrity information area contained in the first recorded overrun extent is recorded to the physical format information area allocated in the lead-in area.

In the opening process for starting data recording again to a disk to which the closing process has been applied, a logical volume integrity descriptor indicating the volume is open is recorded to the unrecorded open integrity information area 111 in overrun extent 110.

Figure 16:
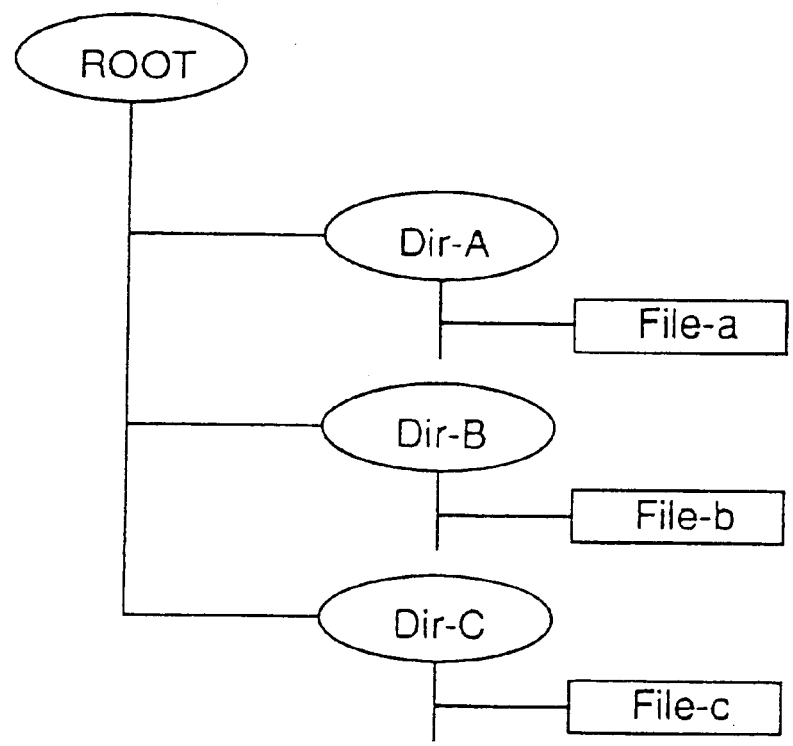
FIG. 16 is a diagram of a directory structure for managing files on disc.

Chaining information area 113 to which updated chaining information is recorded, file structure/file area 114 containing data file (File-a), chaining information area 115 recording the again-updated chaining information, and file structure/file area 116 containing data file (File-b), are formed in the process for sequentially recording data file (File-a) and data file (File-b) according to the directory structure shown in FIG. 16.

Moreover, a chaining information area 117 and an overrun extent 118 containing unrecorded open integrity information area 119 and close integrity information area 120 are formed by again performing a closing operation.

By again performing the opening operation, a logical volume integrity descriptor indicating an open state is recorded to the unrecorded open volume integrity information area 119 in the overrun extent 118.

Finally, when a last data file (File-c) is additionally recorded based on the directory structure shown in FIG. 16, a chaining information area 121 recording the again-updated chaining information and file structure/file area 122 containing data file (File-c) are formed.

It should be noted that while an outline of the data structure of a data storage medium shown in FIG. 1 is described above, a more detailed data structure, including the data recording sequence, is further described below. In addition, while not shown in FIG. 1, an area comprising a link block/run-in block/run-out block as described in the prior art example is recorded as a link extent. The detailed data structure and recording process for a link extent is described in the formatting process and closing process.

Figure 2:
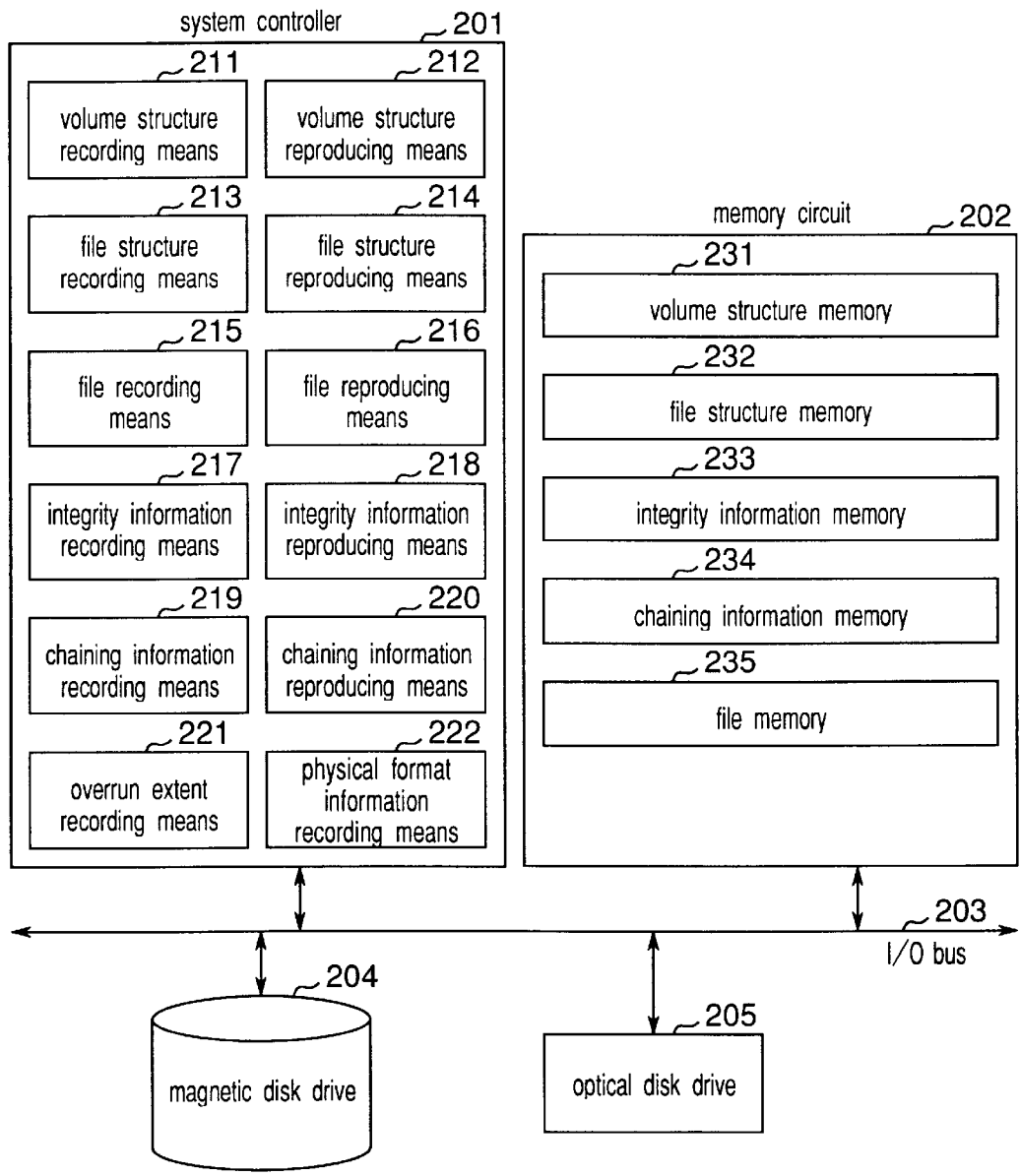
FIG. 2 is a block diagram of a data recording and reproducing apparatus according to a preferred embodiment of the present invention.

FIG. 2 is a block diagram of a data recording and reproducing apparatus according to a preferred embodiment of the present invention. As shown in FIG. 2, this data recording and reproducing apparatus comprises a system controller 201, memory circuit 202, I/O bus 203, magnetic disk drive 204, and optical disk drive 205.

The system controller 201, which is achieved with a control program and a microprocessor containing operating memory, comprises: volume structure recording means 211 for recording volume structure; a volume structure reproducing means 212 for reproducing the volume structure; a file structure recording means 213 for recording file structure; a file structure reproducing means 214 for reproducing file structure; a file recording means 215 for recording file data; a file reproducing means 216 for reproducing file data; a integrity information recording means 217 for recording integrity information containing a logical volume integrity descriptor indicative of an open or close status; a integrity information reproducing means 218 for reproducing integrity information; chaining information recording means 219 for recording chaining information containing an unallocated space ICB and root directory ICB; chaining information reproducing means 220 for reproducing the chaining information; overrun extent recording means 221 for recording an overrun extent containing an open integrity information area and close integrity information area; and physical format information recording means 222 for recording the physical format information recorded to the lead-in area.

The memory circuit 202 comprises volume structure memory 231 used for calculating and temporarily storing volume structure; file structure memory 232 used for calculating and temporarily storing file structure; volume integrity information memory 233 used for calculating and temporarily storing volume integrity information; chaining information memory 234 used for calculating and temporarily storing chaining information; and file memory 235 for temporarily storing a data file.

Figure 3:
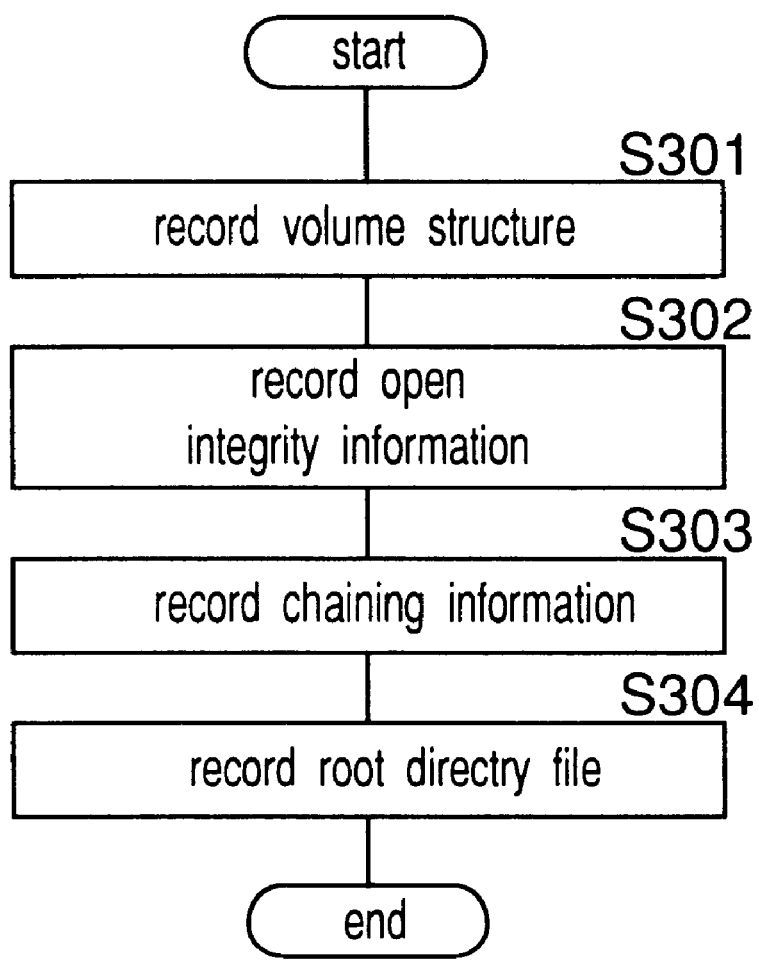
FIG. 3 is a flow chart describing a formatting process of a data recording and reproducing apparatus according to the present invention.

The formatting procedure for a data storage medium according to the present invention is described next below with reference to the block diagram in FIG. 2, the flow chart of the formatting process in FIG. 3, and a diagram of the data structure resulting from this formatting process shown in FIG. 4.

Figure 4:
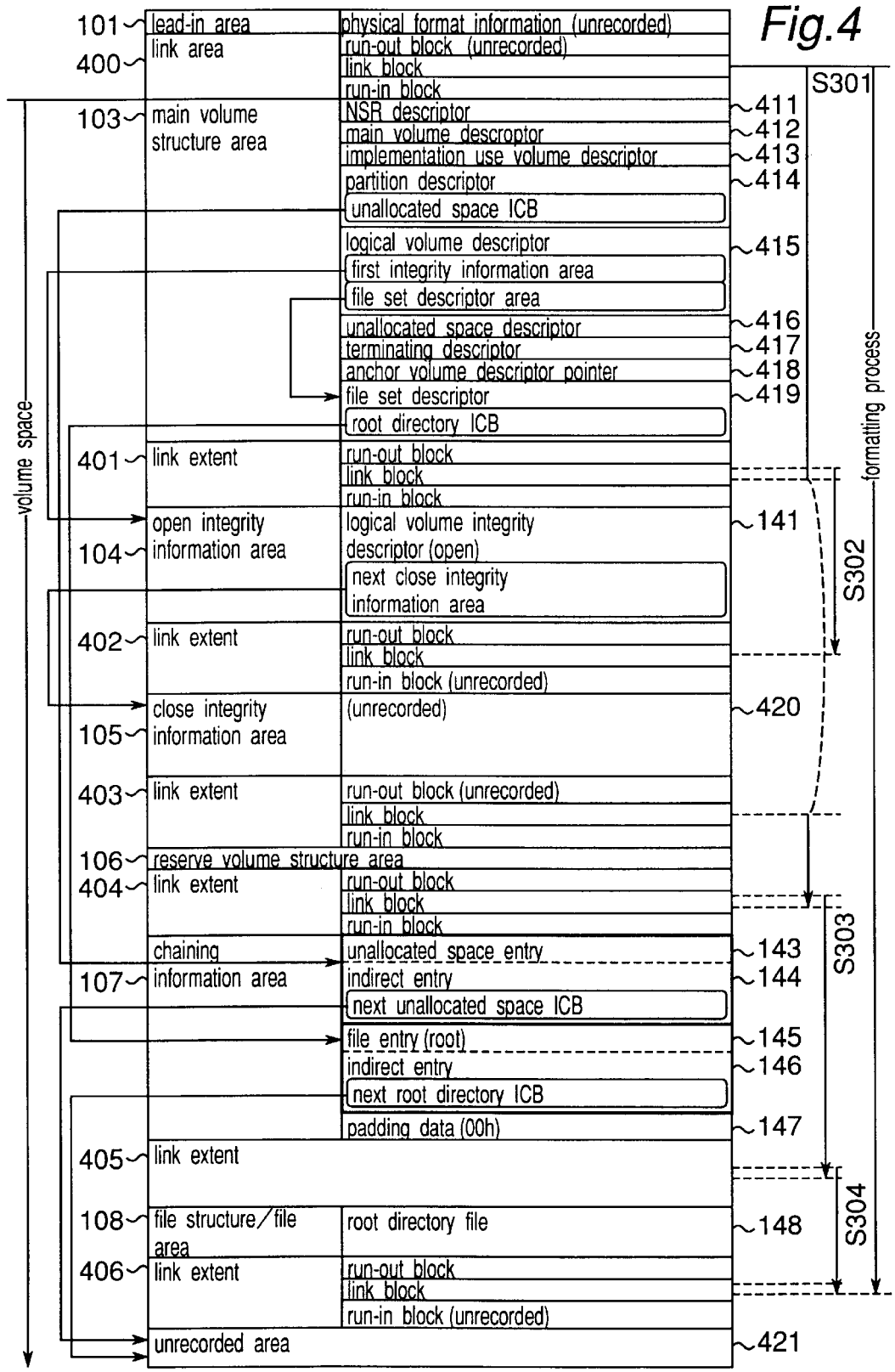
FIG. 4 is a data structure diagram of a formatted data storage medium.

(Step S301) Based on a control program stored internally as volume structure recording means 211, the system controller 201 generates volume structure in the volume structure memory 231 of memory circuit 202 according to the data structure sequence shown in FIG. 4; this volume structure is recorded twice, to main volume structure area 103 and reserve volume structure area 106, and comprises NSR descriptor 411, primary volume descriptor 412, implementation use volume descriptor 413, partition descriptor 414, logical volume descriptor 415, unallocated space descriptor 416, terminating descriptor 417, anchor volume descriptor pointer 418, and file set descriptor 419.

An address for the unallocated space ICB that is recorded as part of the chaining information in step (S303) is contained in the partition descriptor 414 contained in the volume structure. In addition, the logical volume descriptor 415 contains the address of the logical volume integrity descriptor 141 first recorded in the volume space, and the address of the file set descriptor 419. Furthermore, the file set descriptor 419 contains the address of the root directory ICB that is part of the chaining information recorded in step (S303).

The system controller 201 then instructs the optical disk drive 205 to record the volume structure generated in the volume structure memory 231 according to this control program. In this recording command, the system controller 201 specifies the starting address of the reserve volume structure area 106 as the recording position of the reserve volume structure with consideration given to the recording size of the open integrity information area 104, close integrity information area 105, and fixed length link extent 401, link extent 402, and link extent 403.

The optical disk drive 205 then internally generates recording data having a predefined link block/run-in block and run-out block/link block added before and after the volume structure transferred from the volume structure memory 231, and records the main volume structure continuously from the link block of link area 400, and the reserve volume structure continuously from the link block of link extent 403.

When recording the volume structure is completed, the optical disk drive 205 notifies the system controller 201 that recording has ended.

(Step S302) Next, following a program stored internally as the integrity information recording means 217, the system controller 201 generates open integrity information in the integrity information memory 233 of memory circuit 202. This open integrity information contains a logical volume integrity descriptor indicating that the logical volume is open.

It should be noted that the logical volume integrity descriptor contains an integrity type for distinguishing between a close status indicating that a data structure in the logical volume is a complete structure, and an open status indicating that a data structure in the logical volume is an incomplete structure because a data recording operation is in progress. Furthermore, a logical volume integrity descriptor indicating a close status is recorded immediately after recording a file or file structure in the logical volume is completed, and a logical volume integrity descriptor indicating an open status is recorded immediately before recording a file or file structure to a logical volume that is closed. The address of the area used for updating the logical volume integrity descriptor is also contained in the logical volume integrity descriptor. The data structure of this open integrity information is further described in detail below.

The system controller 201 then instructs the optical disk drive 205 to record the open integrity information generated in integrity information memory 233 according to this control program.

As in the recording operation for the volume structure the optical disk drive 205 internally generates recording data having a predefined link block/run-in block and run-out block/link block added before and after the open integrity information transferred from the integrity information memory 233, and records the recording data continuously from the link block of link extent 401. This operation results in data being recorded twice to part of the link block because the above-noted recording of volume structure and this open integrity information recording operation overlap at the link block. This method of recording data bracketing a link area can be achieved using the control procedure as described above with reference to the related art.

When recording the open integrity information is completed, the optical disk drive 205 notifies the system controller 201 that recording has ended.

(Step S303) Next, following a program stored internally as the chaining information recording means 219, the system controller 201 generates chaining information in the chaining information memory 234 of the memory circuit 202.

The unallocated space ICB and root directory ICB contained in the chaining information are defined using the data structure of an ICB defined in ISO 13346.

An unallocated space ICB contains an unallocated space entry 143 for managing unallocated space in the volume space, and an indirect entry 144 with location information for an unused area that is used for updating and recording the unallocated space ICB.

A root directory ICB contains a file entry 145 for a root directory file, and an indirect entry 146 with location information for an unused area that is used for updating and recording the root directory ICB.

The data structure of this chaining information is further described in detail below, but it should be here noted that the various management information contained in the chaining information is identified using descriptor tags, and shall therefore not be limited to any particular recording order.

Furthermore, when the chaining information is recorded in ECC block units comprising a plurality of sectors, padding data 147 is added to the chaining information to fill invalid sectors in an ECC block.

Then, following this control program, the system controller 201 instructs the optical disk drive 205 to record the chaining information generated in the chaining information memory 234.

As in the recording operation for the volume structure, the optical disk drive 205 internally generates recording data having a predefined link block/run-in block and run-out block/link block added before and after the chaining information transferred from the chaining information memory 234, and records the recording data continuously from the link block of link extent 404. When recording the chaining information is completed, the optical disk drive 205 notifies the system controller 201 that recording has ended.

(Step S304) Next, following a program stored internally as the file structure recording means 213, the system controller 201 generates a root directory file in the file structure memory 232 of the memory circuit 202. Then, following this control program, the system controller 201 instructs the optical disk drive 205 to record the root directory file generated in the file structure memory 232.

As in the recording operation for the volume structure, the optical disk drive 205 internally generates recording data having a predefined link block/run-in block and run-out block/link block added before and after the root directory file transferred from the file structure memory 232, and records the recording data continuously from the link block of link extent 405. When recording the root directory file is completed, the optical disk drive 205 notifies the system controller 201 that recording has ended.

When the above-described formatting process is accomplished, a data structure as shown in FIG. 4 is formed on the data storage medium. It should be noted that the arrows S301 to S304 added to FIG. 4 indicate the area recorded in each step shown in FIG. 3.

It should be noted that the main volume structure area 103 and reserve volume structure area 106, the open integrity information area 104, chaining information area 107, and file structure/file area 108 have been described in the above formatting process as being separately recorded in conformance to the command unit processing sequence of a computer system. However, if a dedicated recording device that is not dependent upon the architecture of a computer system is used, it is also possible to perform all or part of these formatting steps continuously. For example, in a simplified formatting process in which recording operations for the main volume structure area 103 and reserve volume structure area 106, open integrity information area 104, chaining information area 107, and file structure/file area 108 are performed continuously while skipping the unrecorded close integrity information area 105, link extents 401, 404, and 405 shown in FIG. 4 do not exist.

In addition, an NSR descriptor 411 containing volume recognition information, primary volume descriptor 412 containing volume attributes, implementation use volume descriptor 413 containing information for recognizing the processing system, partition descriptor 414 containing information about partitions inside the volume, logical volume descriptor 415 containing information for logical volume recognition, unallocated space descriptor 416 containing unallocated space management information, and an terminating descriptor 417 indicating the end of the descriptor set, are recorded in this preferred embodiment as the volume structure, and then a anchor volume descriptor pointer 418 indicating the starting point for the next disk access operation, and file set descriptor 419 containing the address of the file set information and root directory file entry, are recorded. The various management information contained in this volume structure is differentiated using descriptor tags, and the order in which it is recorded shall therefore not be specifically limited.

It should be noted that in ISO 13346 the file set descriptor is defined as part of the file structure, but in the data structure shown in FIG. 4 after the formatting process according to this preferred embodiment, the file set descriptor 419 is recorded in the main volume structure area 103 as part of the volume structure to simplify the description.

A control procedure for a closing process for a data storage medium according to the present invention is described next with reference to the block diagram in FIG. 2, the diagram shown in FIG. 4 of a data structure resulting from the formatting process, the flow chart of this closing process shown in FIG. 5, and the diagram shown in FIG. 6 of the data structure after the closing process.

(Step S501) Following a control program stored internally as volume structure reproducing means 212, the system controller 201 instructs the optical disk drive 205 to read the anchor volume descriptor pointer 418 recorded to main volume structure area 103 at a specific logical sector number. The optical disk drive 205 reads and sends to the volume structure memory 231 of memory circuit 202 the anchor volume descriptor pointer 418 recorded to a specific area on the inserted disk (not shown in the figure).

Next, the system controller 201 interprets the address information of the main volume structure area 103 contained in the read anchor volume descriptor pointer 418, and instructs the optical disk drive 205 to perform a data read operation from main volume structure area 103. The optical disk drive 205 thus reads and transfers to the volume structure memory 231 of memory circuit 202 sequentially from NSR descriptor 411, the primary volume descriptor 412, implementation use volume descriptor 413, partition descriptor 414, logical volume descriptor 415, unallocated space descriptor 416, terminating descriptor 417, and file set descriptor 419.

In addition, the system controller 201 interprets the read partition descriptor 414, logical volume descriptor 415, and file set descriptor 419 to obtain the address information for the unallocated space ICB, file set descriptor, and root directory ICB. It should be noted that if the main volume structure area 103 cannot be reproduced, the volume structure is reproduced from the reserve volume structure area 106.

(Step S502) Following a control program stored internally as integrity information reproducing means 218, the system controller 201 instructs the optical disk drive 205 to reproduce the integrity information area using the address obtained from step (S501) or the following step (S503). The optical disk drive 205 then tries to reproduce data from the specified integrity information area. If data is reproduced from the specified integrity information area, the optical disk drive 205 transfers the reproduced integrity information to the integrity information memory 233 of memory circuit 202. The system controller 201 then performs step (S503) to retrieve the updated integrity information.

If data reproduction is not possible because the specified integrity information area is unrecorded, the system controller 201 decides that the data reproduced last is the latest integrity information, and operation continues from step (S504).

For example, the logical volume integrity descriptor (open) 141 recorded to open integrity information area 104 is the latest integrity information if the data storage medium has been formatted as shown in FIG. 4. The integrity information is described in further detail below.

(Step S503) Following a control program stored internally as integrity information reproducing means 218, the system controller 201 obtains the location of the next integrity information area from the logical volume integrity descriptor contained in the integrity information read in step (S502).

For example, if the data storage medium has been formatted as shown in FIG. 4, the address information 184 of the next close integrity information area is obtained from the logical volume integrity descriptor (open) 141 read from the open integrity information area 104.

(Step S504) Following a control program stored internally as chaining information reproducing means 220, the system controller 201 instructs the optical disk drive 205 to reproduce from the next chaining information area using the address obtained from step (S501) or the following step (S505). The optical disk drive 205 then tries to reproduce data from the specified chaining information area. If data is reproduced from the specified chaining information area, the optical disk drive 205 transfers the reproduced chaining information to the chaining information memory 234 of memory circuit 202. The system controller 201 then performs step (S505) to retrieve the updated chaining information.

If data reproduction is not possible because the specified chaining information area is unrecorded, the system controller 201 decides that the last reproduced chaining information is the latest, and operation continues from step (S506).

For example, the information read from chaining information area 107 is the latest chaining information if the data storage medium has only been formatted as shown in FIG. 4. This chaining information contains unallocated space entry 143 for managing unallocated areas within the volume space as part of the unallocated space ICB, and file entry 145 of the root directory file for managing root directory file 148 as part of the root directory ICB, and this management information is used in the subsequent process.

(Step S505) Following a control program stored internally as chaining information reproducing means 220, the system controller 201 obtains address information for the unallocated space ICB and root directory ICB recorded to the next chaining information area from the indirect entry of the unallocated space ICB and root directory ICB read in step (S504).

For example, if the data storage medium has only been formatted as shown in FIG. 4, the address of the next unallocated space ICB is obtained using the indirect entry 144 of the unallocated space ICB read from chaining information area 107, and the address of the next root directory ICB is obtained using the indirect entry 146 to the root directory ICB. The structure of these indirect entries is described in further detail below.

(Step S506) Following a control program stored internally as file structure reproducing means 214, the system controller 201 detects the address of the root directory file from the file entry for the root directory file contained in the chaining information read in step (S504).

For example, if the data storage medium has only been formatted as shown in FIG. 4, the address of root directory file 148 is obtained from the file entry 145 for the root directory file read from chaining information area 107.

Next, the system controller 201 instructs the optical disk drive 205 to reproduce the root directory file from the file structure/file area using the obtained root directory file address. The optical disk drive 205 reads the latest root directory file from the file structure/file area and transfers it to the file structure memory 232 of memory circuit 202. For example, if the data storage medium has only been formatted as shown in FIG. 4, the root directory file 148 recorded to file structure/file area 108 is sent. If a directory file or data file is recorded under the root directory file, the file entry for the corresponding file and the directory are read and transferred to the file structure memory 232.

When this root directory file reproducing operation ends, the optical disk drive 205 notifies the system controller 201 that reproduction is completed.

(Step S507) Following a control program stored internally as chaining information recording means 219, the system controller 201 temporarily stores chaining information to chaining information memory 234. The stored chaining information includes a root directory ICB containing the address of the root directory file read in step (S506), and an unallocated space ICB with the address of an unallocated area. The system controller 201 then instructs the optical disk drive 205 to record the chaining information stored to chaining information memory 234.

It should be noted that in this recording operation command the system controller 201 specifies the address specified by the indirect entry 144 of the unallocated space ICB recorded in step (S303) of the formatting process as the start address of the chaining information area. As part of the recording operation, the optical disk drive 205 internally generates recording data having a predefined link block/run-in block and run-out block/link block appended before and after the chaining information, and records continuously from link extent 406.

(Step S508) Following a control program stored internally as overrun extent recording means 221, the system controller 201 instructs the optical disk drive 205 to record the overrun extent.

Overrun extent 110 is constructed by a plurality of overrun block recordings. An unrecorded open integrity information area and close integrity information area are allocated before and after the overrun area comprising a predetermined run-out block/link block and link block/run-in block added to the overrun block by the optical disk drive 205. An overrun extent is thus formed by forming an overrun block in an area located before and after an unrecorded open integrity information area and close integrity information area allocated for update recording close integrity information and open integrity information.

When overrun extent recording is completed, the optical disk drive 205 notifies the system controller 201 that recording has been completed.

(Step S509) Following a control program stored internally as integrity information recording means 217, the system controller 201 temporarily stores close integrity information to the integrity information memory 233.

Next, the system controller 201 instructs the optical disk drive 205 to record the close integrity information generated in integrity information memory 233. In this recording operation command, the system controller 201 internally generates recording data by adding a predefined link block/run-in block and run-out block/link block before and after the close integrity information, and records logical volume integrity descriptor (close) 142 to the close integrity information area 105 from the next integrity information area specified by the latest integrity information obtained in step (S503).

(Step S510) Following a control program stored internally as physical format information recording means 222, the system controller 201 instructs the optical disk drive 205 to record the physical format information.

The optical disk drive 205 internally generates recording data having a predefined run-out block/link block and link block/run-in block added therefore and after, and records the physical format information from a specific location in the lead-in area 101 at the inside circumference part of the disc. This physical format information records the address of the open integrity information contained in the first overrun extent in order to prevent a read operation by the data reproducing apparatus from an unrecorded disc area. The read operation of the data reproducing apparatus is described in detail further below.

When recording the physical format information contained in the lead-in area 101 is completed, the optical disk drive 205 notifies the system controller 201 that the recording operation is completed. It should be noted that the open integrity information area in which start address information is recorded as the physical format information is assumed in this step to have been already identified in the integrity information reproduction step (S502) and integrity information address detection step (S503). It should be further noted that this step is only performed in the closing process for first recording an overrun extent to the data storage medium.

Figure 6:
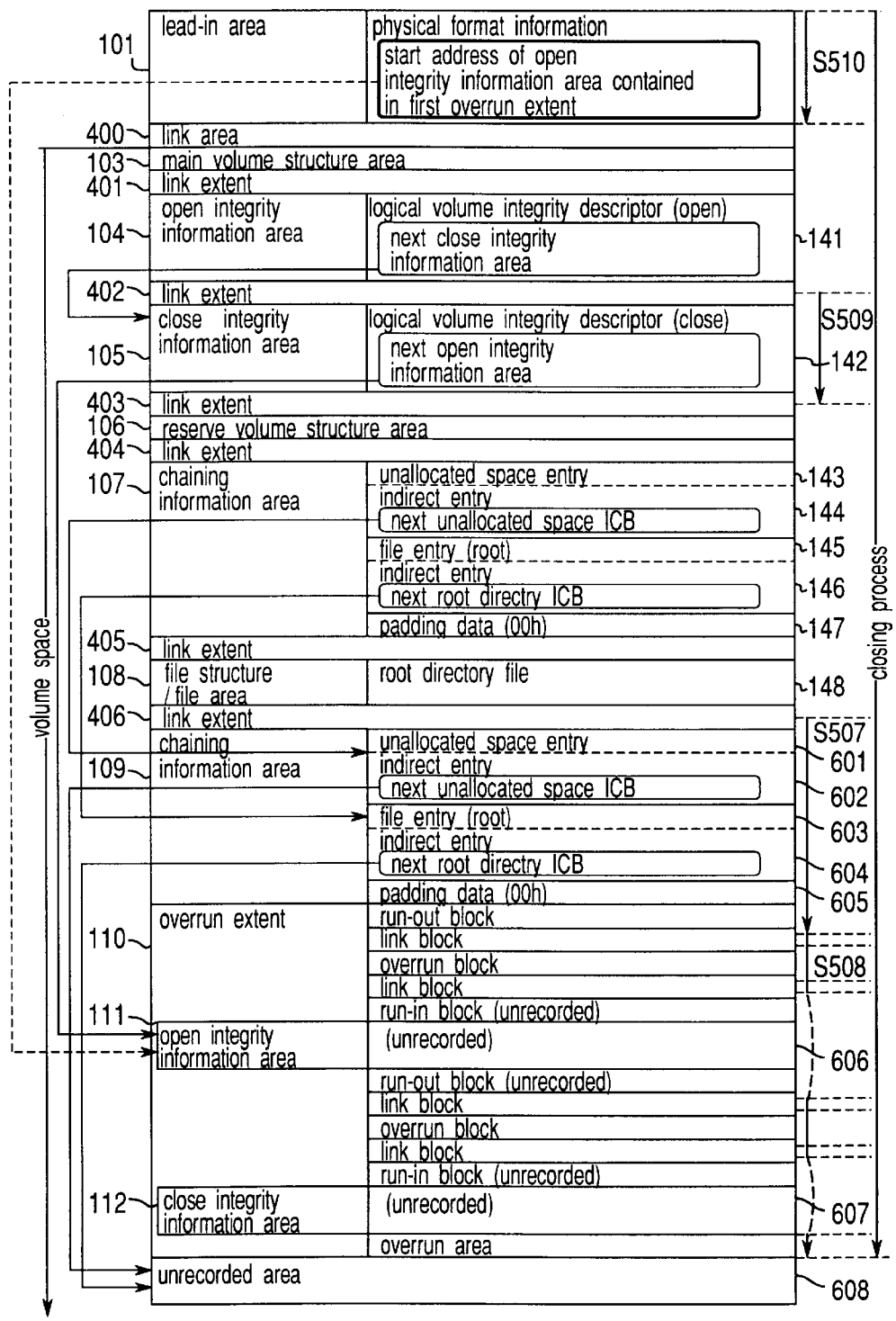
FIG. 6 is a data structure diagram of a data storage medium after the closing process is completed.

A data structure as shown in FIG. 6 is formed on the data storage medium by performing a closing process as described above. It should be noted that arrows S507 to S510 shown in FIG. 6 indicate the areas recorded by the corresponding steps in FIG. 5.

It should be noted that the chaining information recorded in step (S507) and the overrun extent recorded in step (S508) can be recorded in one operation. In this case, the run-out block and link block located at the beginning of the overrun extent 110 are not recorded. In addition, the link extent is not recorded on a recording device that does not record the run-out block/link block/run-in block. In this case the overrun extent comprises only the overrun block, and the recording process is simplified.

It should be noted that the last-read integrity information is determined to be the latest if an area to be recorded in the overrun extent is determined to be unrecorded, but this shall not be limited to detecting an unrecorded state.

In addition, identically to a lead-out area described in the prior art, an overrun extent is an area recorded to prevent overruns into an unrecorded area 608 when a disc data reproducing apparatus without the ability to detect a disc location from an unrecorded area accesses an unrecorded open integrity information area 111 or close integrity information area 112. Furthermore, operating errors resulting from servo disruptions, for example, can be prevented if the disc data reproducing apparatus accesses these areas because the unrecorded open integrity information area 111 or close integrity information area 112 is an area of some plurality of tracks with recorded areas located therebefore and thereafter. It should be noted that so that servo errors do not occur when the data reproducing apparatus accesses an unrecorded area as described above, the overrun extent has dummy data added before and after an unrecorded area that will be accessed, and therefore must be of a size sufficient to achieve the objective.

It should be further noted that, considering the possibility for read errors, the logical volume integrity descriptor recorded to the integrity information area can be plurally recorded across more than one ECC block. It should be further noted that this closing process is performed when the latest integrity information is open integrity information, and it is not necessary to perform another closing process when the latest integrity information is close integrity information.

A control procedure for an opening process to start recording to a data storage medium according to the present invention is described next with reference to the block diagram in FIG. 2, the data structure diagram shown in FIG. 6 after the closing process, the flow chart of this opening process shown in FIG. 7, and the data structure diagram shown in FIG. 8 after this opening process.

(Step S701) As in step (S501) of the above described closing process, the system controller 201 interprets the volume structure read from the main volume structure area 103 or reserve volume structure area 106, and obtains the address of the logical volume integrity descriptor recorded to open integrity information area 104, that is, the first integrity information, and the address of the unallocated space ICB and root directory ICB recorded to chaining information area 107, that is, the first chaining information.

(Step S702) Next, as in step (S502) of the above described closing process, the system controller 201 instructs the optical disk drive 205 to reproduce from the integrity information area using the address obtained from step (S701) or the following step (S703) following a program stored internally as integrity information reproducing means 218. The optical disk drive 205 then tries to reproduce data from the specified integrity information area. If data is reproduced from the specified integrity information area, the optical disk drive 205 transfers the reproduced integrity information to the integrity information memory 233 of memory circuit 202. The system controller 201 then performs step (S703) to retrieve the updated integrity information.

If data reproduction is not possible because the specified integrity information area is unrecorded, the system controller 201 decides that the data reproduced last is the latest integrity information, and operation continues from step (S704).

For example, the logical volume integrity descriptor (close) 142 recorded to close integrity information area 105 is the latest integrity information when the closing process has been applied to the data storage medium as shown in FIG. 6.

(Step S703) As in step (S503) of the above-described closing process, the system controller 201 obtains the location of the next integrity information area contained in the integrity information read in step (S702) following a control program stored internally as integrity information reproducing means 218.

(Step S704) As in step (S504) of the above-described closing process, the system controller 201 instructs the optical disk drive 205 to reproduce from the chaining information area using the address obtained from step (S701) or the following step (S705), following a control program stored internally as chaining information reproducing means 220. The optical disk drive 205 then tries to reproduce data from the specified chaining information area. If data is reproduced from the specified chaining information area, the optical disk drive 205 transfers the reproduced chaining information to the chaining information memory 234 of memory circuit 202. The system controller 201 then performs step (S705) to retrieve the updated chaining information.

If data reproduction is not possible because the specified chaining information area is unrecorded, the system controller 201 decides that the last-reproduced information is the latest chaining information, and operation continues from step (S706).

For example, the information read from chaining information area 109 is the latest chaining information if the closing process has been applied to the data storage medium as shown in FIG. 6. This chaining information contains unallocated space entry 601 for managing unallocated areas in the volume space as part of the unallocated space ICB, and file entry 603 of the root directory file for managing root directory file 148 as part of the root directory ICB, and is used in a subsequent process.

(Step S705) As in step (S503) of the above-described closing process, the system controller 201 obtains address information for the next chaining information area from the indirect entry contained in the chaining information read in step (S704), following a control program stored internally as chaining information reproducing means 220.

For example, if the closing process has been applied to the data storage medium as shown in FIG. 6, the address of the next unallocated space ICB is obtained using the indirect entry 602 of the unallocated space ICB read from chaining information area 109, and the address of the next root directory ICB is obtained using the indirect entry 604 to the root directory ICB.

(Step S706) Following a control program stored internally as integrity information recording means 217, the system controller 201 temporarily stores open integrity information to the integrity information memory 233. The system controller 201 then instructs the optical disk drive 205 to record the open integrity information generated in integrity information memory 233.

In this recording operation command, the system controller 201 internally generates recording data by adding a predefined link block/run-in block and link block/run-out block before and after the open integrity information, and records the logical volume integrity descriptor (open) to the open integrity information area 111 from the address of the following integrity information area specified by the latest integrity information obtained in step (S703).

Figure 8:
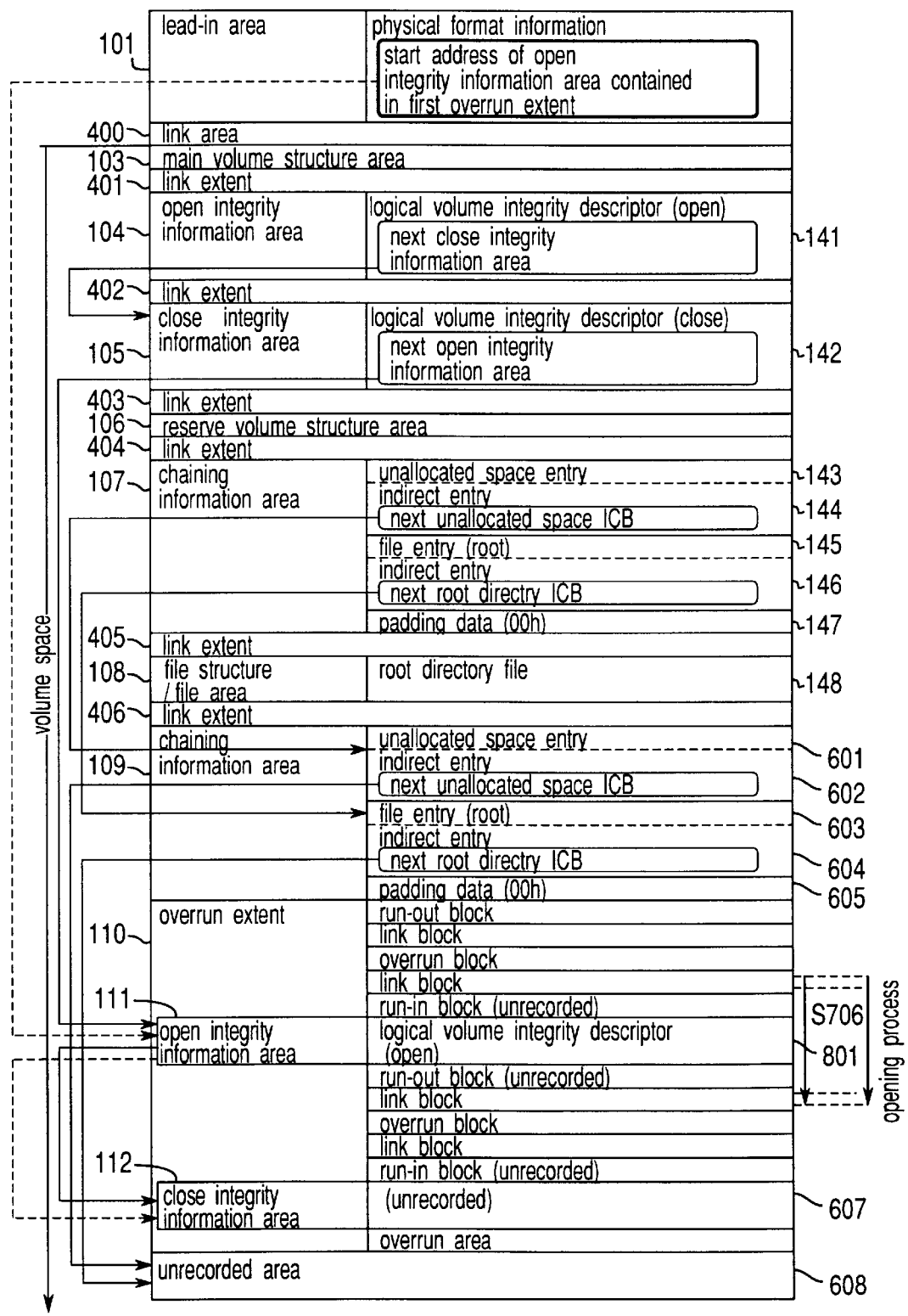
FIG. 8 is a data structure diagram of a data storage medium after the opening process is completed.

When a opening process as described above is accomplished, a data structure as shown in FIG. 8 is formed on the data storage medium. It should be noted that arrow S706 added to FIG. 8 indicates the area recorded in that step shown in FIG. 7.

It should be noted that the same logical volume integrity descriptor recorded to the integrity information area can be recorded a plurality of times to one or more ECC blocks in consideration for the possibility of read errors.

It should be noted that this opening process is performed when the latest integrity information is close integrity information, and the opening process need not be performed again when the latest integrity information is open integrity information.

A control procedure for a process for recording files to a data storage medium according to the present invention is described next with reference to the block diagram in FIG. 2, the diagram shown in FIG. 8 of a data structure after a volume opening process, the flow chart of this file recording process shown in FIG. 9, and the diagram shown in FIG. 10 of the data structure after file recording. It should be noted that in this file recording process data file (File-a) and data file (File-b) stored to magnetic disk drive 204 are described below as being separately recorded according to the directory structure shown in FIG. 16. It should be noted that a link extent formed from a run-in block/link block and run-out block/link block added to recording data is below assumed recorded between each recording operation, and is not particularly described below or shown in the figures.

(Step S901) As in step (S501) of the above described closing process, the system controller 201 interprets the volume structure read from the main volume structure area 103 or reserve volume structure area 106, and obtains the address of the logical volume integrity descriptor recorded to open integrity information area 104, that is, the first integrity information, and the address of the unallocated space ICB and root directory ICB recorded to chaining information area 107, that is, the first chaining information.

(Step S902) As in step (S504) of the above-described closing process, the system controller 201 instructs the optical disk drive 205 to reproduce from the chaining information area using the address obtained from step (S901) or the following step (S903). The optical disk drive 205 then tries to reproduce data from the specified chaining information area. If data is reproduced from the specified chaining information area, the optical disk drive 205 transfers the reproduced chaining information to the chaining information memory 234 of memory circuit 202. The system controller 201 then performs step (S903) to retrieve the updated chaining information.

If data reproduction is not possible because the specified chaining information area is unrecorded, the system controller 201 decides that the data reproduced last is the latest chaining information, and operation continues from step (S904).

For example, the information read from chaining information area 109 is the latest chaining information if the data storage medium is formatted as shown in FIG. 8 because an opening process was accomplished. This chaining information contains unallocated space entry 601 for managing unallocated areas in the volume space as part of the unallocated space ICB, and file entry 603 of the root directory file for managing root directory file 148 as part of the root directory ICB, and is used in a subsequent process.

(Step S903) As in step (S505) of the above-described closing process, the system controller 201 obtains address information for the next chaining information area from the indirect entry contained in the chaining information read in step (S902), following a control program stored internally as chaining information reproducing means 220.

For example, if the closing process has been applied to the data storage medium as shown in FIG. 8, the address of the next unallocated space ICB is obtained using the indirect entry 602 of the unallocated space ICB read from chaining information area 109, and the address of the next root directory ICB is obtained using the indirect entry 604 to the root directory ICB.

(Step S904) As in step (S506) of the above-described closing process, the system controller 201 detects the address of the root directory file from the file entry for the root directory file contained in the chaining information read in step (S902), the following a control program stored internally as file structure reproducing means 214.

Next, the system controller 201 instructs the optical disk drive 205 to reproduce the root directory file from the file structure/file area using the obtained root directory file address. The optical disk drive 205 reads the latest root directory file from the file structure/file area and transfers it to the file structure memory 232 of memory circuit 202. When this root directory file reproducing operation ends, the optical disk drive 205 notifies the system controller 201 that reproduction is completed.

(Step S905) Following a control program stored internally as file recording means 215, the system controller 201 reads data file (File-a) to be recorded to the data storage medium from magnetic disk drive 204, and transfers it to file memory 235 of memory circuit 202. In addition, the system controller 201 generates a directory file (Dir-A) for managing data file (File-a) 149, and file entry (File-a) 150 and file entry (Dir-A) 151 for managing these files, and updates the content of the root directory file read to file structure memory 232 in step (S904). Then, with the directory file and file entry, and data file (File-a), stored to file structure memory 232, the system controller 201 instructs the optical disk drive 205 to record this data according to a control program stored internally as file structure recording means 213 and file recording means 215.

It should be noted that the system controller 201 specifies in this recording command the start address of the file structure/file area 114 for recording the data file and file structure based on the recording size of the chaining information area 113. The location of the unrecorded area specified here is supplied from the latest unallocated space entry detected in the previous step (S902).

The optical disk drive 205 records the file entry and directory file transferred from file structure memory 232, and the file structure/file entry comprising data file (File-a) transferred from file memory 235, to the file structure/file area 114.

When this recording operation to the file structure/file area 114 ends, the optical disk drive 205 notifies the system controller 201 that recording is completed.

Figure 10:
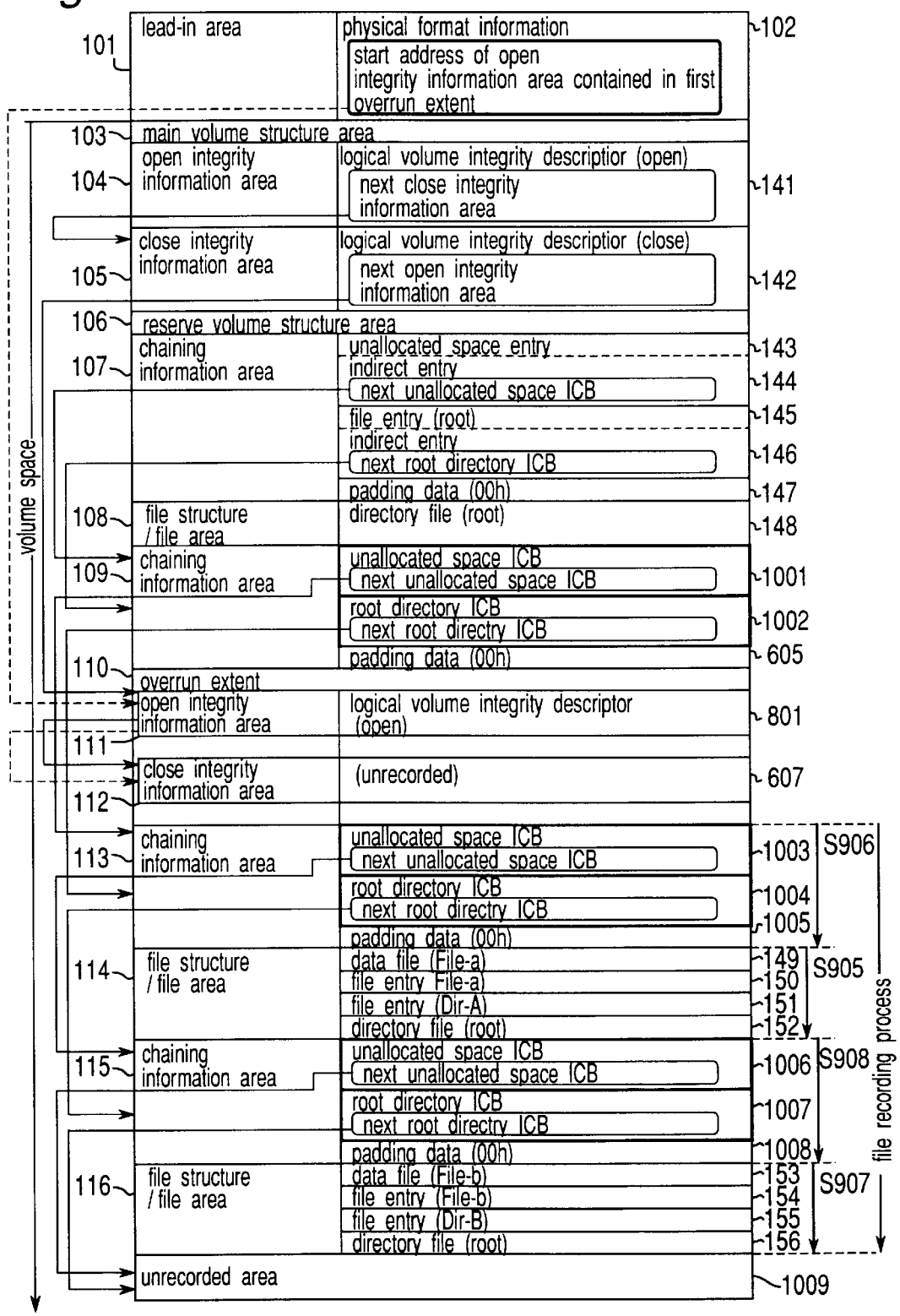
FIG. 10 is a data structure diagram of a data storage medium after the file recording process.

When the data recording operation described above ends, data file (File-a) 149 and a file entry 150 for managing it, file entry 151 for managing directory file (Dir-A), and root directory file 152 are formed in the file structure/file area 114 as shown in FIG. 10. It should be noted that in this preferred embodiment directory file (Dir-A) is recorded embedded in the file entry 151 for managing this directory file, and the directory file itself is therefore not written.

(Step S906) Following a control program stored internally as chaining information recording means 219, the system controller 201 temporarily stores chaining information to chaining information memory 234. The stored chaining information includes a root directory ICB containing the address of the root directory file recorded in step (S905), and an unallocated space ICB with the address of an unallocated area. The system controller 201 then instructs the optical disk drive 205 to record the chaining information stored to chaining information memory 234.

It should be noted that in this recording operation command the system controller 201 specifies the start address of the next unallocated space ICB specified by the indirect entry 144 of the unallocated space ICB recorded in step (S507) of the closing process as the start address of the chaining information area. The optical disk drive 205 also records the chaining information to the chaining information area 113 in this recording operation.

(Step S907) To additionally record a new data file (File-b) using the same control procedure as step (S905), the system controller 201 generates data file (File-b) and updated file structure in file memory 235 and file structure memory 232 of memory circuit 202, and then instructs the optical disk drive 205 to record. The optical disk drive 205 thus records this file structure/file information to file structure/file area 116 while considering the recordingsize of chaining information area 115.

(Step S908) Using the same control procedure as in step (S906), the system controller 201 generates updated chaining information in chaining information memory 234 of memory circuit 202, and then instructs the optical disk drive 205 to record this chaining information. The optical disk drive 205 records this chaining information to chaining information area 115.

A data structure as shown in FIG. 10 is formed on the data storage medium by performing the file recording process described above. It should be noted that the arrows S905 to S908 added to FIG. 10 indicate the area recorded in each step shown in FIG. 9.

Furthermore, the data file, directory file, and file entries for managing these are described as being recorded at once in step (S905) and step (S907), but these files and file entries can be recorded separately. In addition, the recording location of the data file and directory file recorded to file structure/file area 114 or file structure/file area 116, and a file entry for managing the same, is logically managed based on the file structure, and the recording sequence of the data file or directory file and the file entry for managing the same shall therefore not be limited to that shown in the data structure diagram in FIG. 10. In addition, the root directory file can be alternatively recorded with the file entry that is part of the root directory ICB for managing this directory file.

It should be noted that data reliability can be improved by re-reading recorded data, including the file structure, after recording a file, and then recording the file once again if the data cannot be reproduced.

It should be further noted that the file recording process for data file (File-a) in step (S905), and the file recording process for data file (File-b) in step (S907), can be performed on different recording devices.

Figure 13:
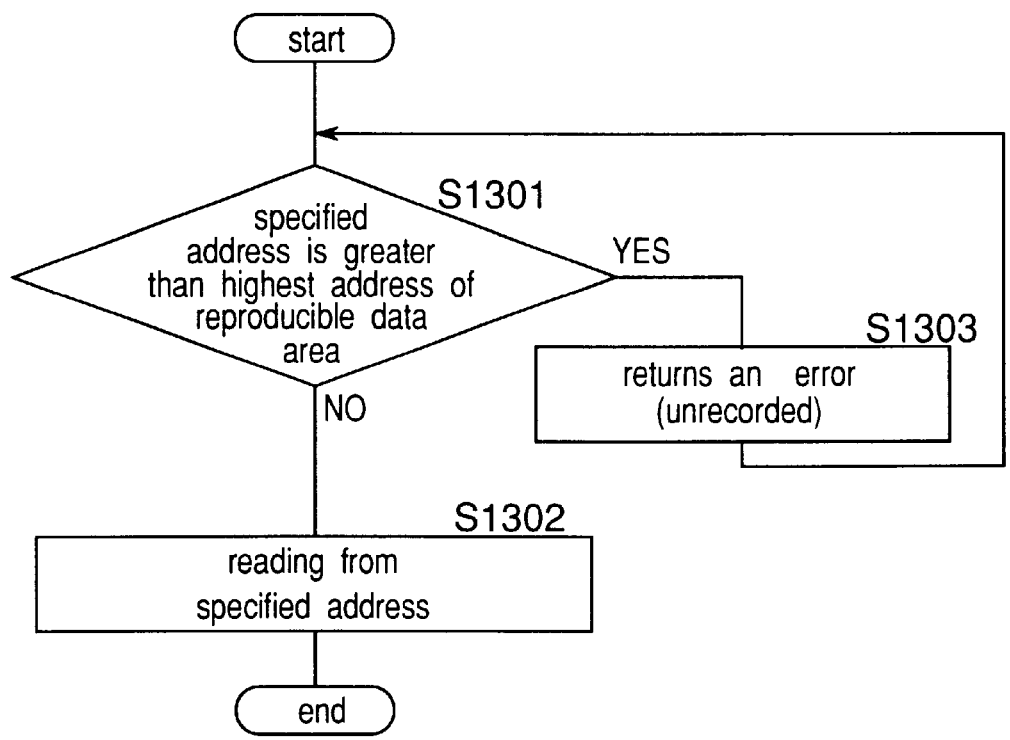
FIG. 13 is a flow chart of a process performed when a read command is executed in a data reproducing apparatus according to a preferred embodiment of the present invention.

A data structure as shown in FIG. 1 is formed on the data storage medium by again performing the closing process shown in the flow chart in FIG. 5 to a data storage medium having a data structure as shown in FIG. 10 described above, and then performing the opening process shown in the flow chart in FIG. 7, and additionally recording a data file (File-c) and file structure under the directory structure shown in FIG. 13 using the same file recording operation shown in the flow chart in FIG. 9.

The data structure of open integrity information and close integrity information characteristic of integrity information according to the present invention is described in detail next below with reference to FIG. 1. Integrity information is recorded by step (S302) of the formatting process shown in FIG. 3, step (S509) of the closing process shown in FIG. 5, and step (S706) of the opening process shown in FIG. 7.

Open integrity information and close integrity information is differentiated by the integrity type of the logical volume integrity descriptor. As for the detailed data structure of the logical volume integrity descriptors, a descriptor tag 182 identifying the descriptor as a logical volume integrity descriptor, an integrity type (open) 183 identifying the descriptor as an open integrity information, and the address 184 of the next close integrity information area, are recorded in the logical volume integrity descriptor (open) 141 recorded to open integrity information area 104 in FIG. 1.

In addition, a descriptor tag 185 identifying the descriptor as a logical volume integrity descriptor, an integrity type (close) 186 identifying the descriptor as a close integrity information, and the address 187 of the next open integrity information area, are recorded in the logical volume integrity descriptor (close) 142 recorded to the close integrity information area 105 shown in FIG. 1.

Open integrity information is thus a logical volume integrity descriptor of which the integrity type is indicative of an open status, and close integrity information is a logical volume integrity descriptor of which the integrity type is indicative of a close status. Because the address of the next logical volume integrity descriptor is recorded to the logical volume integrity descriptor recorded to each integrity information area, successive logical volume integrity descriptors can be read as a chaining of information.

Open integrity information is recorded before user data recording begins, and thus indicates that recording is in progress. Close integrity information is recorded after user data recording is completed, and thus assures a consistency between the recorded file(s) and file management information.

This integrity information thus assures a consistency between files and file management information recorded to a disk. For a read-only disk drive that does not have the ability to detect a disk location in an unrecorded disk area, this integrity information can be used to detect if data is recorded to the disk beyond the overrun extent for preventing reading from unrecorded disk areas. In a data reproducing apparatus, it is also information for detecting the highest address of the reproducible data area for preventing read operations in an unrecorded disc area.

The physical format information recorded to the physical format information area of the lead-in area 101 is described next below with reference to FIG. 1 as one characteristic of the present invention. In this preferred embodiment of the present invention the physical format information is recorded in step (S510) of the closing process shown in FIG. 5. The physical format information is recorded only in the first closing process applied to the medium, and is not recorded in the second and subsequent closing processes. The physical format information is information relating to the physical format, and in a data storage medium according to the present invention stores the start address of the open integrity information area 111 contained in the first overrun extent. The open integrity information start address information 181 allocated to the first overrun extent and recorded to the physical format information is recorded to prevent operating errors resulting, for example, from servo errors when a data reproducing apparatus that does not have the ability to detect a location from an unrecorded data area of a disc accesses an unrecorded area, and is read and used when a disc is inserted to the data reproducing apparatus. Details of this read operation are described further below in conjunction with the reproduction operation of a data reproducing apparatus.

In addition, physical format information area 102 is described as being recorded at the end of the process in the closing process described above. However, if the physical format information area is already recorded using preformed pits, the start address information 181 recorded to the physical format information area is already recorded to a fixed location, and step (S510) for recording the physical format information area in the closing process is skipped.

The data structure of chaining information for file recording/reproducing in a volume/file structure is described next in detail below with reference to FIG. 1. Chaining information is recorded in step (S303) of the formatting process shown in FIG. 3, step (S507) of the closing process shown in FIG. 5, and steps (S906) and (S908) of the file recording process shown in FIG. 9. As described with reference to step (S303), this chaining information has an ICB structure using the ICB strategy 4096 defined as one implementation of ISO 13346. Chaining information in the present embodiment comprises an unallocated space ICB containing unallocated space entry 143 and indirect entry 144 for managing unallocated space, root directory ICB containing file entry 145 and indirect entry 146 of the root directory file, and padding data 147.

Descriptor tag 188 for identifying the descriptor as an unallocated space entry, and allocation descriptor 189 for managing unallocated area addresses, are recorded to the unallocated space entry 143 part of the unallocated space ICB. In addition, descriptor tag 190 for identifying the descriptor as an indirect entry, and address 191 for the next unallocated space ICB, are recorded to the indirect entry 144 of the unallocated space ICB.

Furthermore, descriptor tag 192 for identifying the descriptor as a file entry, and allocation descriptor 193 for root directory file address management, are recorded to the root directory file entry 145 part of the root directory ICB. In addition, descriptor tag 194 for identifying the descriptor as an indirect entry, and address 195 for the next root directory ICB, are recorded in the indirect entry 146 part of the root directory ICB.

By recording the addresses for the next unallocated space ICB and root directory ICB to the indirect entry of the unallocated space ICB and root directory ICB in the chaining information, these ICBs can be read in a chain. The unallocated space entry part of the unallocated space ICB determined to be the latest information specifies the latest unallocated area, and the root directory file entry part of the root directory ICB specifies the latest root directory.

The unallocated area address recorded to the allocation descriptor of the latest unallocated space entry is simultaneously the address from which file structure/file information recording starts.

When the data storage medium uses a physical format in which data is recorded in ECC block units with error correction code added for a plurality of sectors, padding data 147 is recorded to the data storage medium after forming ECC blocks by adding padding data to valid data.

Open integrity information and close integrity information indicating the volume integrity status is recorded in the volume space by the file recording process, opening process, and closing process of the present invention. Therefore, each time the disc is removed from a drive, a large volume data area, such as the lead-out area or lead-in area, is not recorded. It is also possible to detect a disc open status, which occurs when a disc is removed while recording is in progress or when an error occurs during data recording, and thereby improve the reliability of recorded data.

Figure 14:
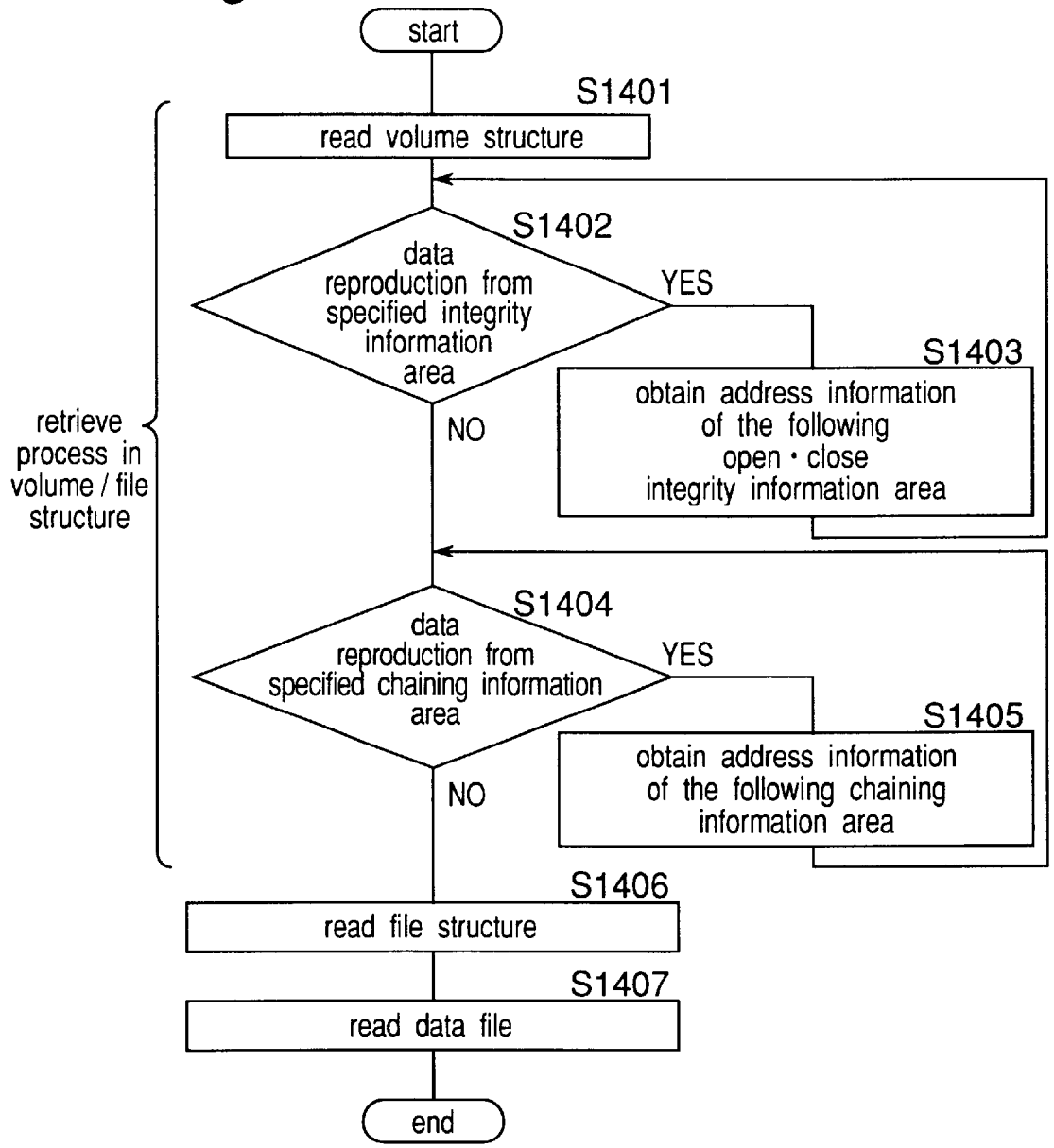
FIG. 14 is a flow chart of a file reproduction process in a data reproducing apparatus according to the present invention.
Figure 15:
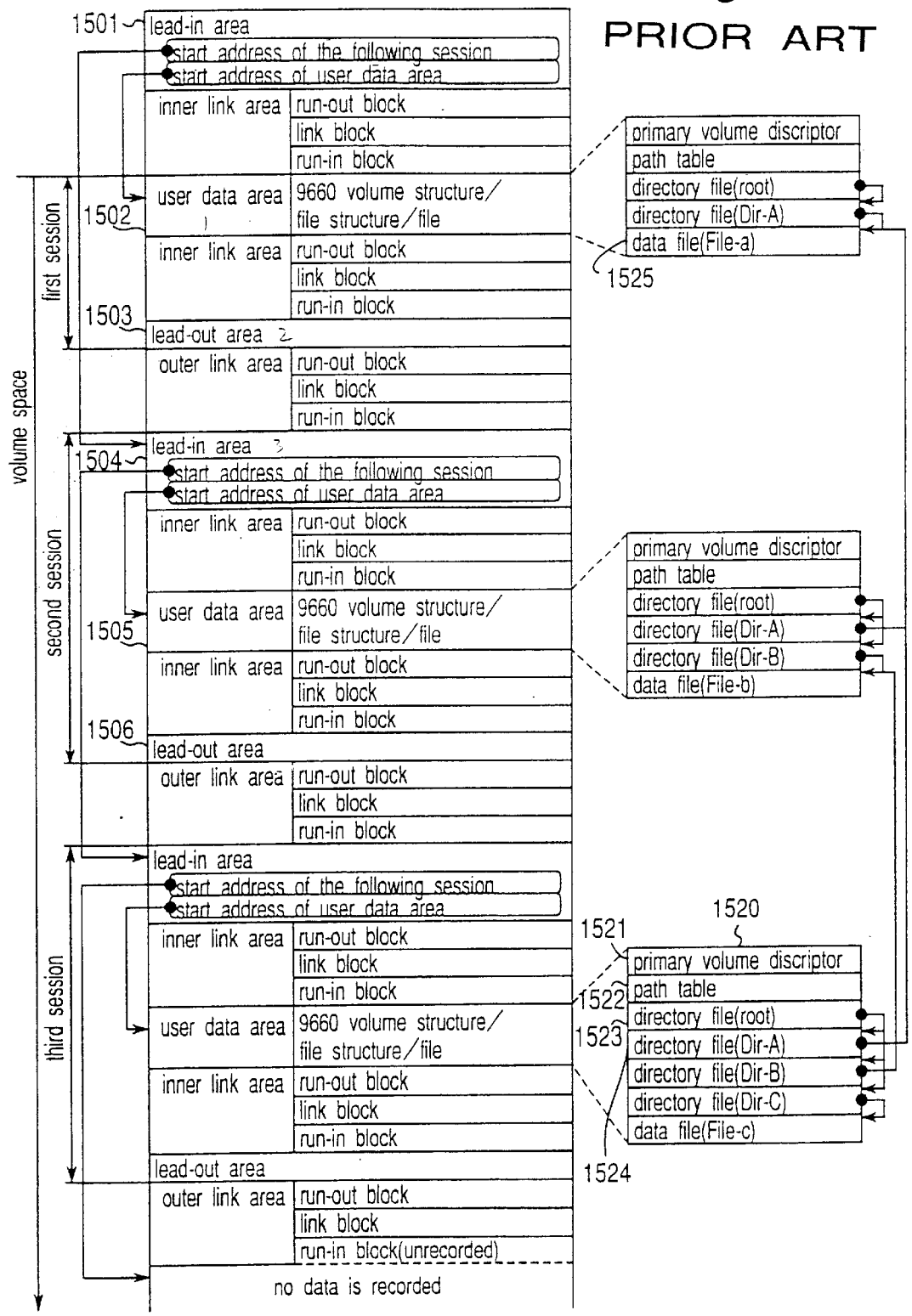
FIG. 15 is a data structure diagram of a CD-R disc recorded with a conventional multi-session method.

A file reproduction process whereby a data reproducing apparatus reads files from a data storage medium according to the present invention is described next below with reference to the block diagram in FIG. 11, the flow chart shown in FIG. 12 of a process run by the data reproducing apparatus when a disc is inserted, the flow chart of a process run by the data reproducing apparatus when implementing a READ command as shown in FIG. 13, a flow chart of the file reproduction process shown in FIG. 14, and the data structure diagram shown in FIG. 1.

Figure 11:
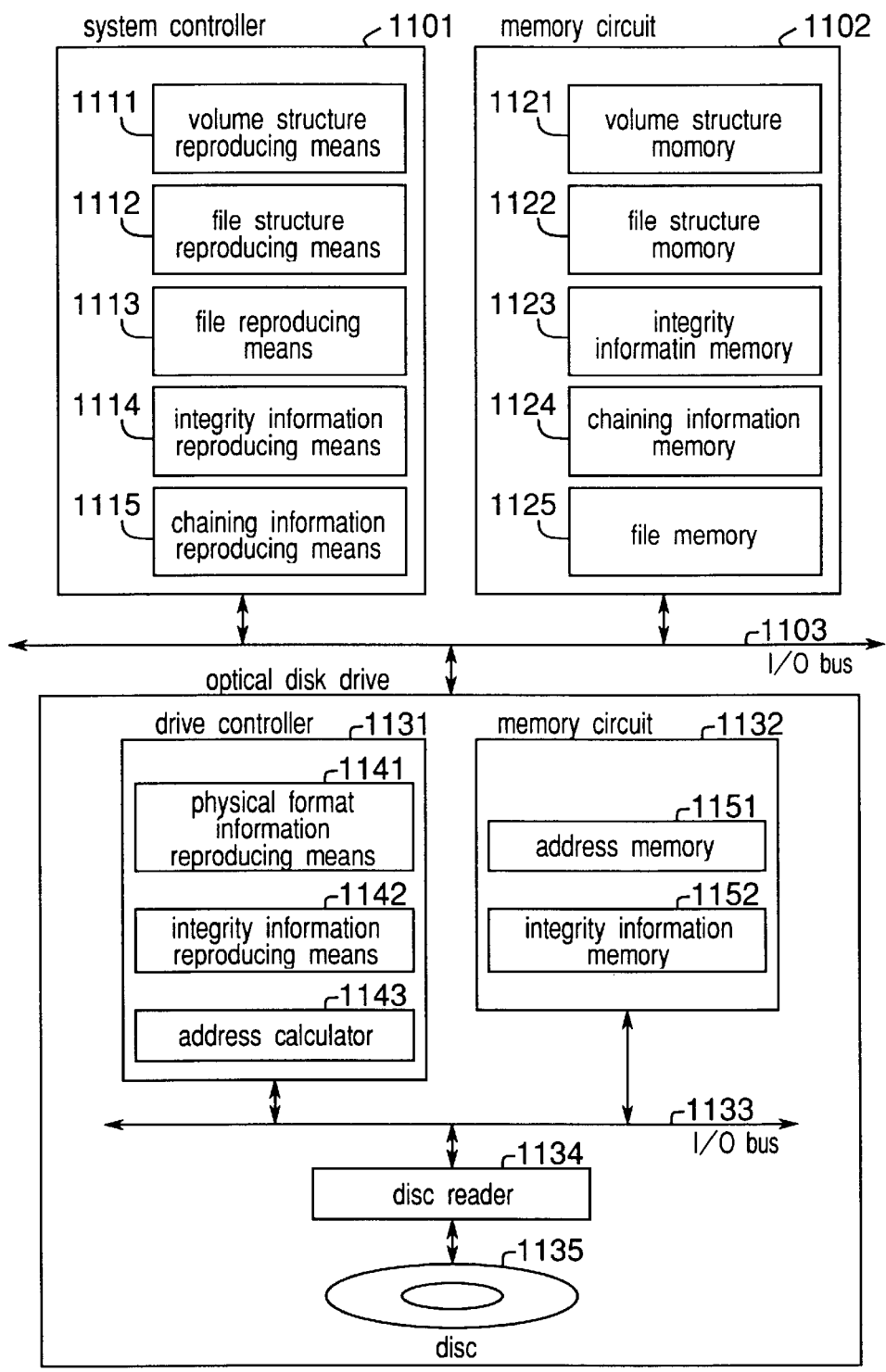
FIG. 11 is a block diagram of a data reproducing apparatus according to a preferred embodiment of the present invention.

FIG. 11 is a block diagram of a data reproducing apparatus according to a preferred embodiment of the present invention. As shown in FIG. 11, this data reproducing apparatus comprises a system controller 1101, memory circuit 1102, I/O bus 1103, and optical disk drive 1104.

The system controller 1101, which is achieved with a control program and a microprocessor containing operating memory, comprises: volume structure reproducing means 1111 for reproducing volume structure; a file structure reproducing means 1112 for reproducing file structure; a file reproducing means 1113 for reproducing file data; a integrity information reproducing means 1114 for reproducing integrity information; and chaining information reproducing means 115 for reproducing chaining information.

The memory circuit 1102 comprises volume structure memory 1121 used for calculating and temporarily storing volume structure; file structure memory 1122 used for calculating and temporarily storing file structure; integrity information memory 1123 used for calculating and temporarily storing integrity information; chaining information memory 1124 used for calculating and temporarily storing chaining information; and file memory 1125 for temporarily storing a data file.

The optical disk drive 1104 comprises a drive controller 1131, memory circuit 1132, I/O bus 1133, disc reader 1134, and disc 1135.

The drive controller 1104 [sic] comprises a physical format information reproducing means 1141 for reproducing the physical format information; integrity information reproducing means 1142 for reproducing integrity information; and address calculator 1143. Memory circuit 1132 comprises address memory 1151 for storing the highest address of the reproducible data area, and integrity information memory 1152 for storing integrity information. In a data reproducing apparatus in which the system and drive are not separated, such as in consumer products, the system controller 1101 and drive controller 1131, memory circuit 1102, and memory circuit 1132 can be disposed as identical controller and memory circuit blocks.

In general, when a disc having remaining unrecorded areas is inserted in the data reproducing apparatus and the system controller 1101 of the data reproducing apparatus accesses an unrecorded disc area as a result of a READ command requesting a data reproduction operation, the data reproducing apparatus may generate an error. This is because stable signal reproduction becomes difficult for the data reproducing apparatus, and the head could contact the disc surface during disc access, because the servo system is unstable as a result of signals detected from an unrecorded disc area being weak and signal quality being poor. When such conditions occur, there is the possibility of damaging data already recorded to the disc, in addition to problems occurring with the access mechanism of the data reproducing apparatus. A method for preventing access to an unrecorded disc area as a result of READ command execution is described next below with reference to the flow chart shown in FIG. 12 for a process of the optical disc drive when a disc recorded with the data structure shown in FIG. 1 is inserted into a data reproducing apparatus as shown in FIG. 11.

(Step S1201) When it is detected that a disc has been inserted to the optical disk drive 1104, the drive controller 1131 instructs the disc reader 1134 to reproduce the physical format information area contained in the lead-in area of the disc following a control program stored internally as physical format information reproducing means 1141. Because the start address information 181 of the open integrity information area allocated to the first overrun extent is recorded to the physical format information area as noted above, this address information is obtained. For example, the location of the open integrity information area 111 specified by start address information 181 of the open integrity information allocated to the first overrun extent recorded to the lead-in area 101 is obtained with a data storage medium having a data structure as shown in FIG. 1.

(Step S1202) Following a control program stored internally as the integrity information reproducing means, drive controller 1131 instructs an integrity information reproduction operation using the address information obtained in step (S1201) or the next step (S1203). The disc reader 1134 then accesses the specified integrity information area and attempts a data reproduction operation. If data is reproduced from the specified integrity information area, the disc reader 1134 sends the reproduced information to the integrity information memory 1152 of memory circuit 1132. To retrieve the updated integrity information, the drive controller 1131 then accomplishes step (S1203).

If data could not be reproduced because the specified integrity information area is unrecorded, the drive controller 1131 proceeds to the next step (S1204) to calculate the highest address of the reproducible data area. For example, in a data storage medium with a data structure as shown in FIG. 1, the open integrity information area 119 recorded to overrun extent 118 is the latest integrity information.

(Step S1203) Following a control program stored internally as the integrity information reproducing means, the drive controller 1131 obtains the location of the next integrity information area contained in the integrity information read in step (S1202).

(Step S1204) Following a control program stored internally as the address calculator, the drive controller 1131 calculates the highest address of the reproducible data area from the location information of the next integrity information stored by the latest integrity information obtained in step (S1202) so that the system controller 1101 does not try to read an unrecorded disc area. In this exemplary embodiment of the invention the last address of the chaining information area 117 is calculated from the address of the open integrity information area 119, that is, the latest integrity information, in FIG. 1. The drive controller 1131 stores the highest address of the reproducible data area obtained by this calculation to the address memory 1151 of the memory circuit 1132.

When a process as described above is run on a disc drive, integrity information recorded to the disc is sequentially reproduced, and the highest address of the reproducible data area accessible by a READ command is obtained from the last-recorded integrity information. By thus confirming the highest address of the reproducible data area, accessing an unrecorded disc area by a READ command can be prevented, and stable data reproduction can be achieved.

A process of the optical disk drive 1104 that is performed to reproduce a file from a data storage medium according to the present invention when the system controller 1101 applies a data reproduction command to the optical disk drive 1104 is described next below with reference to FIG. 13.

(Step S1301) Following a control program stored internally as the address calculator, the drive controller 1131 compares the highest address of the reproducible data area obtained in the above-noted step (S1204) and stored to the address memory 1151 of memory circuit 1132 with the address specified for reading.

(Step S1302) Following a control program stored internally as the address calculator, the drive controller 1131 permits reading from the specified address if the specified address is lower than the highest address of the reproducible data area because an unrecorded disc area will not be accessed, and returns the read data to the system controller 1101.

(Step S1303) Following a control program stored internally as the address calculator, the drive controller 1131 returns an error to the system controller 1101 if the specified address is greater than the highest address of the reproducible data area because there is the danger of reading from an unrecorded disc area.

The above-noted evaluation of the specified read address is accomplished each time a normal read command is executed.

It should be noted that by the optical disk drive 1104 temporarily storing the obtained address information of the integrity information in the memory circuit, the optical disk drive can return the data stored to the integrity information memory without accessing the integrity information area when an integrity information area reproduction operation is instructed by the system controller 1101 or drive controller 1131. Data read operations can therefore be accomplished at high speed.

A control procedure for a file reproduction process for reading a file from a data storage medium according to the present invention is described next below with reference to the block diagram of a data reproducing apparatus shown in FIG. 11 and the flow chart of a file reproduction process shown in FIG. 14. It is assumed below that this file recording process reproduces data file (File-a) managed using the directory structure shown in FIG. 16.

(Step S1401) As in step (S501) of the above described closing process, the system controller 1101 interprets the volume structure read from the main volume structure area 103 or reserve volume structure area 106, and obtains the address of the logical volume integrity descriptor recorded to open integrity information area 104, that is, the first integrity information, and the address of the unallocated space ICB and root directory ICB recorded to chaining information area 107, that is, the first chaining information.

(Step S1402) As in step (S502) of the above described closing process, the system controller 1101 instructs the optical disk drive 1104 to reproduce from the integrity information area using the address obtained from step (S1401) or the following step (S1403) following a program stored internally as integrity information reproducing means 1114. The optical disk drive 1104 then tries to reproduce data from the specified integrity information area. If data is reproduced from the specified integrity information area, the optical disk drive 1104 transfers the reproduced integrity information to the integrity information memory 1123 of memory circuit 1102. The system controller 1101 then performs step (S1403) to retrieve the updated integrity information.

If data reproduction is not possible from the specified integrity information area, the system controller 1101 decides that the data reproduced last is the latest integrity information, and operation continues from step (S1404).

For example, the logical volume integrity descriptor (close) recorded to close integrity information area 112 is the latest integrity information on a data storage medium to which a data file (File-c) has been recorded as shown in FIG. 1.

(Step S1403) As in step (S503) of the above-described closing process, the system controller 1101 obtains the location of the next integrity information area read in step (S1402) following a control program stored internally as integrity information reproducing means 1114.

(Step S1404) As in step (S504) of the above-described closing process, the system controller 1101 instructs the optical disk drive 1104 to reproduce from the chaining information area using the address obtained from step (S1401) or the following step (S1405). The optical disk drive 1104 then tries to reproduce data from the specified chaining information area. If data is reproduced from the specified chaining information area, the optical disk drive 205 [sic] transfers the reproduced chaining information to the chaining information memory 1124 of memory circuit 1102. The system controller 1101 then performs step (S1405) to retrieve the updated chaining information.

If data reproduction is not possible because the specified chaining information area is unrecorded, the system controller 1101 decides that the last-reproduced information is the latest chaining information, and operation continues from step (S1406).

For example, the information recorded to chaining information area 117 is the latest chaining information on a data storage medium to which a data file (File-c) has been recorded as shown in FIG. 1.

(Step S1405) As in step (S505) of the above-described closing process, the system controller 1101 obtains address information for the next chaining information area from the read chaining information.

(Step S1406) As in step (S506) of the above-described closing process, the system controller 1101 refers to the latest chaining information read from chaining information area 177, and reads root directory file 156 according to the file entry allocation descriptor of the root directory file contained therein. Next, starting from this root directory file 156, the system controller 1101 sequentially reads and references the content of file entry 151 for directory file (Dir-A) and the directory file (Dir-A) recorded in this file entry, and file entry 150 for data file (File-a).

(Step S1407) Finally, the system controller 1101 reads the data file (File-a) 149 by means of file reproducing means 1113, and ends the file reproduction operation.

Figure 12:
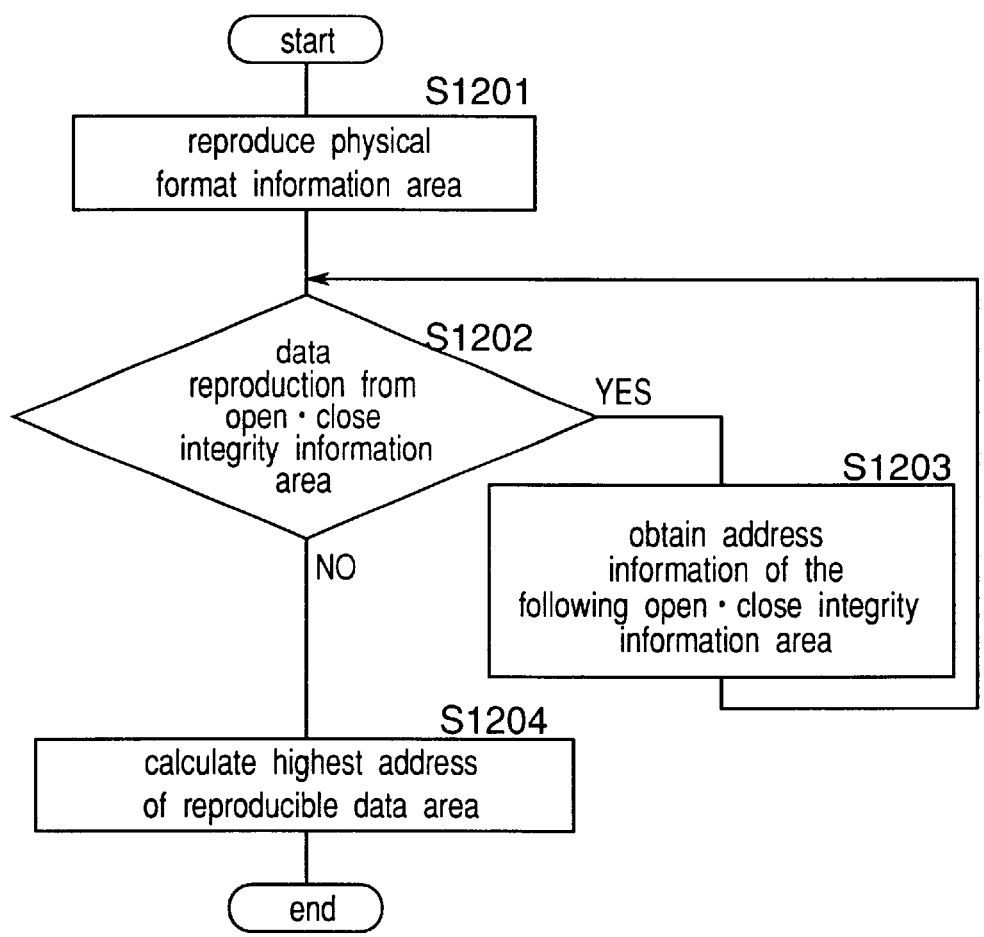
FIG. 12 is a flow chart showing a process performed upon disc insertion to a data reproducing apparatus according to a preferred embodiment of the present invention.

A data reproducing apparatus not having the ability to detect a disc location from an unrecorded disc area is thus prevented from reading data beyond overrun extent 118 shown in FIG. 1 by the highest address calculating process shown in FIG. 12 and the read evaluation process shown in FIG. 13. Comparing the read address with the highest address of the data recording area is a process performed by the optical disc drive, enabling the system controller to reproduce data files and file integrity information using only a READ command.

It should be noted that with a recording device capable of disc location detection even from unrecorded disc areas, root directory file 160 will be read in step (S1406).

It will be obvious that the above-described file reproduction operation is accomplished in the same way for data file (File-b) and data file (File-c). By adding a function for preventing access to unrecorded disc areas to an optical disc drive, a file reproduction operation as thus described can retrieve and reproduce all data files using only the volume structure and file structure recorded in the volume space.

A dedicated command for reading TOC data, a type of file retrieval information, from a lead-in area as described in the prior art is therefore unnecessary; when a disc is inserted the optical disc drive itself can apply a process for preventing access to an unrecorded disc area by a READ command, and the system side can reproduce all files using only a READ command used for data reproduction operations in the volume space. As a result, the structure of software for managing the file system of this type of data storage medium and software for controlling the interface of an optical disc drive in a PC system can be simplified.

Furthermore, compatibility with existing file systems is high because reading is possible using the file system of conventional read-only disk drives once the latest root directory file is found.

What is claimed is:

1. A data storage medium in which a file managed using a volume/file structure is recorded and reproduced from one end of a data recording area, and in which a number of data recording operations to a same area is limited, the medium comprising:

a physical formal information area in a part of a lead-in area, for recording address information of an open integrity information area allocated in an overrun extent, said open integrity information area being provided for recording a logical volume integrity descriptor indicative of an open volume status, and said overrun extent being provided to prevent overruns into an unrecorded area.

2. A data recording method for performing a data recording operation on a data storage medium in which a file managed using a volume/file structure is recorded and reproduced from one end of a data recording area, and in which a number of data recording operations to a same area is limited, the method comprising:

recording, to a part of a lead-in area in a first closing process applied to the medium, physical format information that includes address information of an open integrity information area allocated in an overrun extent, said open integrity information area being provided for recording a logical volume integrity descriptor indicative of an open volume status, and said overrun extent being provided to prevent overruns into an unrecorded area.

3. A data recording apparatus for performing a data recording operation on a data storage medium in which a file managed using a volume/file structure is recorded and reproduced from one end of a data recording area, and in which a number of data recording operations to a same area is limited, the apparatus comprising:

a recorder that records, to a part of a lead-in area in a first closing process applied to the medium, physical format information for recording address information of an open integrity information area allocated in an overrun extent, said open integrity information area being provided for recording a logical volume integrity descriptor indicative of an open volume status, and said overrun extent being provided to prevent overruns into an unrecorded area.

4. A data reproducing method for performing a data reproducing operation on a data storage medium, the data storage medium being configured to record and reproduce a file managed based on a volume/file structure from one end of a data recording area, the data storage medium limiting a number of data recording operations to a same area, the data reproducing method comprising:

reproducing, from a lead-in area, physical format information that records address information of an open integrity information area allocated in an overrun extent, said open integrity information area being provided for recording a logical volume integrity descriptor indicative of an open volume status;

reproducing from an overrun extent, a logical volume integrity descriptor indicating a closed status, the logical volume integrity descriptor indicating the close status including address information of an open integrity information area, said overrun extent being provided to prevent overruns into an unrecorded area; and reproducing, from an overrun extent, a logical volume integrity descriptor indicating an open status, the logical volume integrity descriptor indicating the open status including address information of a closed integrity information area.

5. A data reproducing apparatus for performing a data reproducing operation on a data storage medium, the data recording medium being configured to record and reproduce a file managed based on a volume/file structure from one end of a data recording area, the data storage medium limiting a number of data recording operations to a same area, the apparatus comprising:

a first recorder that reproduces, from a lead-in area, physical format information that records address information of an open integrity information area allocated in an overrun extent, said open integrity information area being provided for recording a logical volume integrity descriptor indicative of an open volume status;

a second recorder that reproduces, from an overrun extent, a logical volume integrity descriptor indicating a closed status and storing address information for a logical volume integrity information area in an open status, said overrun extent being provided to prevent overruns into an unrecorded area; and a third recorder that reproduces, from an overrun extent, a logical volume integrity descriptor in an open status and storing address information for a logical volume integrity information area in a close closed status.

* * * * *

UNITED STATES PATENT AND TRADEMARK OFFICE
CERTIFICATE OF CORRECTION

PATENT NO.   : 6,762,984 B1
DATED        : July 13, 2004
INVENTOR(S)  : M. Sasaki et al.

It is certified that error appears in the above-identified patent and that said Letters Patent is hereby corrected as shown below:

Column 27,
Line 14, after "reproducing" insert -- , --.

Column 28,
Line 23, delete "close".

Signed and Sealed this

Fourth Day of January, 2005

JON W. DUDAS
*Director of the United States Patent and Trademark Office*